(12) United States Patent
Futaki

(10) Patent No.: US 12,232,033 B2
(45) Date of Patent: *Feb. 18, 2025

(54) RADIO COMMUNICATION SYSTEM, RADIO TERMINALS, RADIO BASE STATIONS, RADIO COMMUNICATION METHOD AND PROGRAM

(71) Applicant: NEC CORPORATION, Tokyo (JP)

(72) Inventor: Hisashi Futaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 18/235,579

(22) Filed: Aug. 18, 2023

(65) Prior Publication Data

US 2023/0397104 A1 Dec. 7, 2023

Related U.S. Application Data

(60) Continuation of application No. 17/137,471, filed on Dec. 30, 2020, now Pat. No. 11,792,731, which is a
(Continued)

(30) Foreign Application Priority Data

Oct. 2, 2009 (JP) ................. 2009-230114

(51) Int. Cl.
*H04W 52/02* (2009.01)
*H04L 1/1812* (2023.01)
(Continued)

(52) U.S. Cl.
CPC ....... *H04W 52/0216* (2013.01); *H04L 1/1812* (2013.01); *H04L 1/1848* (2013.01);
(Continued)

(58) Field of Classification Search
CPC ......... H04W 52/0216; H04W 72/0453; H04W 76/28; H04W 72/23; H04W 52/0232;
(Continued)

(56) References Cited

U.S. PATENT DOCUMENTS

| 9,059,845 B2 | 6/2015 | Dalsgaard et al. |
| 2009/0016252 A1 | 1/2009 | Ho et al. |

(Continued)

FOREIGN PATENT DOCUMENTS

| CN | 1864426 A | 11/2006 |
| JP | 2012-510207 A | 4/2012 |

(Continued)

OTHER PUBLICATIONS

LG Electronics (Multi-level DRX Operation in CELL_PCH, May 7, 2007, 3GPP, 4 pages) (Year: 2007).*

(Continued)

*Primary Examiner* — Christopher M Crutchfield
*Assistant Examiner* — Jean F Voltaire
(74) *Attorney, Agent, or Firm* — Sughrue Mion, PLLC

(57) ABSTRACT

Disclosed is a radio communication system wherein radio terminals can communicate using a plurality of component carriers having different frequencies. The communication system has a reception start timing control means for commonly controlling the cycle of reception start timing for predetermined channels in at least some of the component carriers assigned to the radio terminals; and a reception control means for controlling the reception interval of said predetermined channels, said reception intervals being started at the reception start times in at least some of the component carriers assigned to the radio terminals.

3 Claims, 24 Drawing Sheets

Related U.S. Application Data continuation of application No. 15/634,458, filed on Jun. 27, 2017, now Pat. No. 10,924,994, which is a division of application No. 14/555,800, filed on Nov. 28, 2014, now Pat. No. 9,749,952, which is a division of application No. 13/499,526, filed as application No. PCT/JP2010/067062 on Sep. 30, 2010, now Pat. No. 9,042,248.

(51) Int. Cl.

| | | |
|---|---|---|
| *H04L 1/1829* | (2023.01) | |
| *H04W 52/46* | (2009.01) | |
| *H04W 72/04* | (2023.01) | |
| *H04W 72/0453* | (2023.01) | |
| *H04W 72/1273* | (2023.01) | |
| *H04W 72/23* | (2023.01) | |
| *H04W 76/28* | (2018.01) | |

(52) U.S. Cl.
CPC ....... *H04W 52/0232* (2013.01); *H04W 52/46* (2013.01); *H04W 72/04* (2013.01); *H04W 72/0453* (2013.01); *H04W 72/1273* (2013.01); *H04W 72/23* (2023.01); *H04W 76/28* (2018.02); *Y02D 30/70* (2020.08)

(58) Field of Classification Search
CPC . H04W 52/46; H04W 72/04; H04W 72/1273; H04L 1/1812; H04L 1/1848
USPC ......................................................... 370/329
See application file for complete search history.

(56) References Cited

U.S. PATENT DOCUMENTS

| | | | |
|---|---|---|---|
| 2009/0180414 A1 | 7/2009 | Maeda et al. | |
| 2009/0181670 A1* | 7/2009 | Tseng | H04W 76/28 455/434 |
| 2009/0232054 A1* | 9/2009 | Wang | H04W 76/28 370/328 |
| 2009/0239566 A1 | 9/2009 | Pelletier et al. | |
| 2010/0136992 A1 | 6/2010 | Harada et al. | |
| 2010/0150086 A1 | 6/2010 | Harada et al. | |
| 2010/0317345 A1 | 12/2010 | Futaki et al. | |
| 2010/0322173 A1* | 12/2010 | Marinier | H04W 52/0241 370/329 |
| 2011/0002281 A1 | 1/2011 | Terry et al. | |
| 2011/0039536 A1 | 2/2011 | Lee et al. | |
| 2011/0243008 A1* | 10/2011 | Kim | H04L 1/1893 370/252 |
| 2012/0057490 A1 | 3/2012 | Park et al. | |
| 2012/0176950 A1 | 7/2012 | Zhang et al. | |
| 2012/0292851 A1 | 11/2012 | Monopoli | |
| 2014/0092758 A1 | 4/2014 | Suzuki et al. | |

FOREIGN PATENT DOCUMENTS

| | | | |
|---|---|---|---|
| JP | 2012-530405 A | 11/2012 | |
| JP | 2013-506357 A | 2/2013 | |
| WO | 2008/096685 A1 | 8/2008 | |
| WO | 2008/108224 A1 | 9/2008 | |
| WO | 2008/133306 A1 | 11/2008 | |
| WO | 2008/133310 A1 | 11/2008 | |
| WO | 2008/156130 A | 12/2008 | |
| WO | 2009/114802 A1 | 9/2009 | |
| WO | 2009120124 A1 | 10/2009 | |
| WO | 2010/059926 A1 | 11/2009 | |
| WO | 2010/100966 A1 | 9/2010 | |
| WO | 2010/147956 A2 | 12/2010 | |
| WO | 2011/040516 A1 | 4/2011 | |

OTHER PUBLICATIONS

3GPP TS 36.321 V8.6.0 (Jun. 2009), "3rd Generation Partnership Project; Technical Specification Group Radio Access Network; Evolved Universal Terrestrial Radio Access (EUTRA); Medium Access Control (MAC) protocol specification(Release 8)", Jun. 2009, pp. 1-pp. 47.

3GPP TS 36.331 V8.6.0 (Jun. 2009); Technical Specification; 3rd Generation Partnership Project; Technical Specification Group Radio Access Network; Evolved Universal Terrestrial Radio Access (E-UTRA); Radio Resource Control (RRC); Protocol specification; full document, pp. 1-207.

3GPP TS 36.300 V9.0.0 (Jun. 2009); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; full document, pp. 1-157.

Communication dated Nov. 3, 2017, issued by the State Intellectual Property Office of People's Republic of China in counterpart Chinese application No. 201510263488.1.

3GPP TS 36.321 V9.0.0 (Sep. 2009); Technical Specification; 3rd Generation Partnership Project; Technical Specification Group Radio Access Network; Evolved Universal Terrestrial Radio Access (E-UTRA) Medium Access Control (MAC) protocol specification; full document, pp. 1-47.

CATT, "Consideration on DRX", 3GPP TSG RAN WG2 Meeting #66bis, Jun. 29-Jul. 3, 2009, R2-093725 (total 3 pages).

Communication dated Sep. 30, 2020, from the Japanese Patent Office in application No. 2019-152234.

3GPP TR 36.814 VI .0.0(Feb. 2009); Technical Report; 3rd Generation Partnership Project; Technical Specification Group Radio Access Network; Further Advancements for E-UTRA Physical Layer Aspects; full document, pp. 1-31.

Communication dated Jul. 12, 2017, issued by the Japanese Patent Office in counterpart Japanese application No. 2016-035061.

Communication dated Jul. 24, 2019 from Japanese Patent Office in counterpart JP Application No. 2018-202437.

ITRI, "Discussion of DRX in Carrier Aggregation", 3GPP TSG-RAN WG2 #67bis, R2-094908, Aug. 24-28, 2009, 4pp, Shenzhen, China.

Email rapporteur (NEC), "Summary of email discussion on DRX control" [online], 3GPP TSG-RAN WG2#57bis R2-071553, Internet <URL:http://www.3gpp.org/ftp/tsg_ran/WG2_RL2/TSGR2_57bis/Documents/R2-071553.zip>, Mar. 26, 2007.

Communication dated Mar. 18, 2015 from the Japanese Patent Office in counterpart application No. 2011-534300.

Communication dated Jun. 3, 2015, issued by the Japan Patent Office in corresponding Japanese Application No. 2014-204415.

Communication dated Dec. 21, 2016, from the Japanese Patent Office in counterpart application No. 2016-035061.

Communication dated Dec. 2, 2015 from the United States Patent and Trademark Office issued in U.S. Appl. No. 14/555,800.

Communication dated Aug. 6, 2014, issued by the Japanese Patent Office in counterpart Japanese application No. 2014-123282.

Communication dated Apr. 22, 2016 from the U.S. Patent and Trademark Office in counterpart U.S. Appl. No. 14/692,129.

CATT, "Consideration on DRX", 3GPP TSG-RAN WG2 #67, R2-094327, Aug. 24-28, 2009, 3pp, Shenzhen, China.

CATT, "Consideration on DRX", 3GPP TSG RAN WG2 Meeting #66, R2-092992, May 4-8, 2009, 2pp, San Francisco, USA.

3GPP TS36.321, Evolved Universal Terrestrial Radio Access (E-UTRA) ; Radio Resource Control (RRC); Protocol specification; 3GPP Specification detail.

3GPP TS36.300, "Evolved Universal Terrestrial Radio Access (E-UTRA) and Evolved Universal Terrestrial Radio Access Network (E-UTRAN); Overall description; Stage 2", 3GPP Specification detail.

3GPP TR36.814; Evolved Universal Terrestrial Radio Access (E-UTRA) ; Further advancements for E-UTRA physical layer aspects, 3 GPP Specification detail.

3GPP TR36.331; Evolved Universal Terrestrial Radio Access (E-UTRA) ; Medium Access Control (MAC) protocol specification; 3GPP Specification detail.

LG Electronics, "Multi-level DRX Operation in CELL_PCH", 3GPP TSG-RAN, R2-071930, May 7-11, 2007, 4 pp, Kobe, Japan.

(56) References Cited

OTHER PUBLICATIONS

Motorola, "DRX in LTE-A", 3GPP TSG RAN2 #67, R2-094736, Aug. 24-29, 2009, 3pp., Shenzhen, China.
NTT DoCoMo, "RRC_Connected DRX and dedicated UL resource release", 3GPP TSG RAN Wg2 #61, R2-081157, Feb. 11-15, 2008, 4pp, Sorrento, Italy.
Research In Motion UK Limited, DRX Operation for Carrier Aggragation [online], 3GPP TSG-RAN WG2#67 R2-094283, Internet <URL:http://www.3gpp.org/ftp/tsg_ran/ WG2_RL2/TSGR2_67/Docs/R2-094283.zip>, Aug. 24, 2009.
Search Report dated Feb. 7, 2014, issued by the State Intellectual Property Office of the P.R.C. in corresponding Chinese Application No. 201080045110X.
MediaTek, "DRX Operation in Carrier Aggregation Mode for LTE-A", 3GPP TSG RAN WG2 Meeting #67, R2-094258, Aug. 24-28, 2009, 2pp, Shenzhen, PROC.
Japanese Office Action for JP Application No. 2019-152234 mailed on Jun. 23, 2021 with English Translation.
Extended European Search Report for EP Application No. EP21191382.7 dated on Mar. 22, 2022.
Ericsson "Impact of Carrier Aggregation on the L2 protocol architecture for LTE Rel-10", R2-092957, Apr. 28, 2009, USA, pp. 1/8-8/8.

\* cited by examiner

RADIO COMMUNICATION SYSTEM, RADIO TERMINALS, RADIO BASE STATIONS, RADIO COMMUNICATION METHOD AND PROGRAM

CROSS-REFERENCE TO RELATED APPLICATIONS

This application is a continuation of U.S. patent application Ser. No. 17/137,471, filed Dec. 30, 2020, which is a continuation of U.S. patent application Ser. No. 15/634,458, filed Jun. 27, 2017 (now U.S. Pat. No. 10,924,994), which is a divisional of U.S. patent application Ser. No. 14/555,800, filed Nov. 28, 2014 (now U.S. Pat. No. 9,749,952), which is a divisional of U.S. patent application Ser. No. 13/499,526, filed Mar. 30, 2012 (now U.S. Pat. No. 9,042,248), which is a National Stage of International Application No. PCT/JP2010/067062, filed Sep. 30, 2010, which claims priority from Japanese Patent Application No. 2009-230114, filed on Oct. 2, 2009, the contents of all of which are incorporated herein by reference in their entirety.

TECHNICAL FIELD

The present invention relates to a radio communication system, a radio terminal, a radio base station, a radio communication method, and a program therefor.

BACKGROUND ART

The radio terminal is supported with a DRX functionality (DRX: Discontinuous Reception) in 3 GPP LTE (Long Term Evolution), being one of next-generation cellar systems, so as to reduce power consumption of the radio terminal (Non-patent literatures 1 and 2). In the LTE, a period called a DRX cycle that consists of a reception period (On-Duration) and a non-reception period subsequent hereto (Opportunity for DRX) is defined, and repeating these periods allows the DRX to be realized.

The radio terminal shall receive a downlink control channel (PDCCH: Physical Downlink Control Channel) at any time in the On-Duration, and does not need to receive it in the Opportunity for DRX. Additionally, when the radio terminal fails in receiving data during the On-Duration and yet the above data is retransmitted after the On-Duration period, it extends the period in which the PDCCH is received.

Herein, the period in which the radio terminal under DRX operation receives the PDCCH is called Active Time, and the On-Duration is a minimum value of the Active Time. In addition, two DRX states (levels), i.e. "ShortDRX" and "LongDRX" each having a different length of the Opportunity for DRX can be set for each radio terminal. When the radio terminal in a ShortDRX state does not receive the data for a constant period, the LTE takes a DRX state control for transiting to a LongDRX state. Further, a timer (drxShortCycleTimer) is used for determining a state transition from the ShortDRX to the LongDRX. This makes it possible to set the DRX state (level) suitable for a data reception frequency of the radio terminal, and to realize a reduction of power consumption of the radio terminal.

In addition, as the cellar system having the LTE sophisticated therein, LTE-Advanced is standardized. As one of the LTE-Advanced Functionalities, there exists carrier aggregation (Carrier Aggregation: CA) for performing data transmission/reception by simultaneously using a plurality of the component carriers (Component Carrier: CC) for one radio terminal, which serves as a functionality of enhancing a peak date rate for each radio terminal (Non-patent literature 3). Herein the so-called CC is a basic frequency block necessary for realizing the communication between the radio base station and the radio terminal in the LTE. When the CA is carried out, one transport block (a unit for transferring data from an MAC layer to a PHY layer) is transmitted/received on one CC, and a signal process is independently performed for each CC. Additionally, when HARQ is carried out because retransmission of the data is required, the CC used for the first transmission is identical to the CC used for the retransmission.

At present, in 3GPP Standardization, a discussion about the DRX of the radio terminal at the time of the CA is underway, and a method of carrying out identical DRX configuration (setting of a DRX parameter) to all the CCs for performing the Carrier Aggregation (CA) is being investigated. As an actual method of the DRX control (an Active Time control and a DRX state control), a method (A) of cooperatively taking a control among the CCs for performing the CA (Non-patent literature 5) and a method (B) of independently taking a control on each CC (Non-patent literature 6) are proposed. In the method (A) of cooperatively taking a control among the CCs, the DRX state control is commonly taken among the CCs by aligning the Active Time on all the CCs to that of the CC on which the data has been received to the end. On the other hand, in the method (B) of independently taking a control on each CC, the Active Time of each CC is decided based on a data reception situation on each CC, and the DRX state control is also taken independently on each CC.

An example of the method (A) of cooperatively taking a control among the CCs for performing the CA will be explained by employing FIG. 24.

This figure shows a situation in which a certain radio terminal is assigned CC1 to CC3 as the CC for performing the CA and the radio terminal is ready for reception of DL data on all these CCs. Further, a DRX parameter on each CC is identical, and starts of respective DRX cycles are synchronized with each other among the CCs. Upon paying attention to a first-place DRX cycle of the CC1, the Active Time is extended so that the retransmission data can be received because the DL data was not able to be successfully decoded notwithstanding the reception of the DL data in the On-Duration. And, the CC1 transits to the non-reception period (Opportunity for DRX) in which the PDCCH does not need to be received when the retransmission data can be successfully decoded.

Next, upon paying attention to the operations on the CC2 and the CC3 at the DRX cycle having the identical timing, no data is received on the CC2, and the data is received on the CC3 similarly to the CC1. At this time, upon viewing the CC2 and the CC3 separately, there is no necessity for extending the Active Time beyond the On-Duration on the CC2, and the Active Time is extended on the CC3; however the Active Time of the CC3 may be shorter than that of the CC1.

However, in the method (A), all the Active Times of the CC1 to CC3 are ones depicted by dotted lines in the figure because the Active Times of the CC2 and the CC3 are decided so as to match with that of the CC1 requiring the longest Active Time. Herein, the hatching portion in the figure is the Active Time that has been originally unnecessarily extended for the above CC. The situation is similar with the second-place DRX cycle and the third-place DRX cycle as well, the Active Time is controlled so as to match with that of the CC3 at the second-place DRX cycle and with the CC2 at third-place DRX cycle, respectively.

Next, an example of the method (B) of independently taking a control on each CC will be explained by employing FIG. 25.

Similarly to FIG. 24, the radio terminal is ready for reception of the DL data on the CC1 to CC3, the DRX parameter is identical on each CC, and the starts of respective DRX cycles are synchronized with each other among the CCs. In addition, it is assumed that the radio terminal is firstly in a state of the ShortDRX, and transits to the LongDRX when the data is not received over three-time ShortDRXs (the length of drxShortCycleTimer is equivalent to three times that of the ShortDRX cycle).

Upon paying attention to the first-place DRX cycle, the drxShortCycleTimers are independently started on all the CCs. The data is received on the CC1 and the CC3, and the drxShortCycleTimer is restarted after the data reception is completed (it is again started from the initial value). The data is not received on the CC2, whereby the timer is successively running as is. In such a manner, the drxShortCycleTimer is activated on each CC. The CC3, on which the drxShortCycleTimer expires at the fifth-place DRX cycle earliest, transits to the LongDRX, and the CC1 transits to the LongDRX at the sixth-place DRX cycle. On the other hand, the CC2 receives the data also at the sixth-place DRX cycle with still the state of the ShortDRX.

As a result, only the CC2 can be used at the seventh-place DRX cycle and the eighth-place DRX cycle, and the CC1 and the CC3 cannot be used because they are in the non-reception period of the LongDRX. Additionally, it is at a timing of the On-Duration next to the LongDRX cycle that the CC1 and the CC3 can be used again.

CITATION LIST

Non-Patent Literature

NON-PTL 1: 3GPP T S 36.300v900 (internet<URL>http://www.3gpp.org/ftp/Specs/html-info/36300.htm)
NON-PTL 2: 3GPP TS36.321v860 (internet<URL>http://www.3gpp.org/ftp/Specs/html-info/36321.htm)
NON-PTL 3: 3GPP TR36.814v100 (internet<URL>http://www.3gpp.org/ftp/S p ecs/html-info/36814.htm) NON-PTL 4: 3GPP TR36.331v860 (internet<URL>http://www.3gpp.org/ftp/Specs/html-info/36331.htm)
NON-PTL 5: 3GPP RAN2 #67 Shenzhen China, "DRX in LTE-A", Motorola (internet<URL>http://www.3gpp.org/ftp/tsgran/WG2RL2/TSGR267/Docs/R2-094736.zip)
NON-PTL 6: 3GPP RAN2 #67 Shenzhen China, "Consideration on DRX", CATT (internet<URL>http://www.3gpp.org/ftp/tsg_ran/WG2_RL2/TSGR2_67/Docs/R2-094327.zip)

SUMMARY OF INVENTION

Technical Problem

Hereinafter, the related technologies in accordance with the present invention are analyzed.

At first, there exist two points that are important in investigating the DRX control with the use of the Carrier Aggregation (CA). The first point is that the DRX state (an index indicative of the ShortDRX or the LongDRX. It is also called a DRX level) of the radio terminal should be same among the Component Carriers (CCs). The reason is that the data is not received at any time on all the CCs at the time of the CA, and the DRX state should be decided based on not a data reception frequency on each CC but a total data reception frequency of the radio terminal notwithstanding a possibility that a data reception frequency on each CC might differ due to a difference of the communication channel quality among the CCs and a load distribution.

And, the second point is that the Active Time should be decided for each CC at each DRX cycle. The reason is to avoid extending the Active Time beyond the On-Duration so as to match with the other CCs notwithstanding no possibility of the data reception, and to enable the radio terminal to realizes a reduction of power consumption as much as possible.

Out of the above-described DRX control methods, while the method (A) of cooperatively taking a control among the CCs used for performing the CA has an advantage that the DRX state is identical among the CCs, it has an a disadvantage that the radio terminal excessively consumes the power on the CC in which the data is not received because the Active Time at each DRX cycle is also identical among the CCs.

On the other hand, while the method (B) of independently taking a control on each CC has an advantage that an effect of a reduction of the power consumption of the radio terminal is achieved at each DRX cycle because the Active time is independent for each CC, it has a disadvantage that the DRX state might differ among the CCs.

In such a manner, the above-described DRX control methods (A) and (B) when the CA is performed have the advantage/disadvantage, respectively, the method (A) of cooperatively taking a control among the CCs for performing the CA is preferred from a viewpoint of the DRX state control, being the first point, and the method (B) of independently taking a control on each CC is preferred from a viewpoint of a reduction of power consumption of the radio terminal, being the second point.

Judging from the analysis mentioned above, it cannot be safely said that each of the above-described DRX control methods, which is capable of accomplishing only one of the two important points, is an optimum DRX control method at the time of the CA.

Thereupon, the present invention has been accomplished in consideration of the above-mentioned problems, and an object thereof is to provide a radio communication system, a radio terminal, a radio base station, a radio communication method, and a program therefor that reduce the power consumption of the radio terminal while coping with the communication over a plurality of the component carriers.

Solution to Problem

The present invention is radio communication system in which a radio terminal is configured to communicate using a plurality of carrier components each having a different frequency, comprising: a reception start timing control means that commonly controls a cycle of a reception start timing for a predetermined channel among at least one part of the component carriers assigned to the radio terminal: and a reception control means that controls a reception period for said predetermined channel on at least one part of the component carriers assigned to said radio terminal, said reception period being started from said reception start timing.

The present invention is a radio terminal capable of communicating using a plurality of carrier components each having a different frequency, comprising: a reception start timing control means that commonly controls a cycle of a reception start timing for a predetermined channel among at least one part of the component carriers assigned to the radio terminal; and a reception control means that controls a reception period for said predetermined channel on at least one part of the component carriers assigned to said radio terminal, said reception period being started from said reception start timing.

The present invention is a radio base station for transmitting/receiving data to/from a radio terminal capable of communicating using a plurality of component carriers each having a different frequency that comprises a reception start timing control means for commonly controlling a cycle of a reception start timing for a predetermined channel among at least one part of the component carriers assigned to said radio terminal, and a reception control means for controlling a reception period for said predetermined channel to be started from said reception start timing on at least one part of the component carriers assigned to said radio terminal, said radio base station comprising a means that takes synchronization with the cycle of the reception start timing for the predetermined channel to be controlled by said radio terminal.

The present invention is a radio communication method in which a radio terminal is configured to communicate using a plurality of component carriers each having a different frequency, comprising: commonly controlling a cycle of a reception start timing for a predetermined channel among at least one part of the component carriers assigned to the radio terminal; and controlling a reception period for said predetermined channel on at least one part of the component carriers assigned to said radio terminal, said reception period being started from said reception start timing.

The present invention is a program of a radio terminal capable of communicating using a plurality of component carriers each having a different frequency, said program causing the radio terminal to execute: a reception start timing control process of commonly controlling a cycle of a reception start timing for a predetermined channel among at least one part of the component carriers assigned to the radio terminal; and a reception control process of controlling a reception period for said predetermined channel on at least one part of the component carriers assigned to said radio terminal, said reception period being started from said reception start timing.

Advantageous Effect of Invention

The present invention makes it possible to reduce the consumption power of the radio terminal while coping with the communication over the plural component carriers.

DESCRIPTION OF EMBODIMENTS

An outline of the present invention will be explained.

Figure 26:
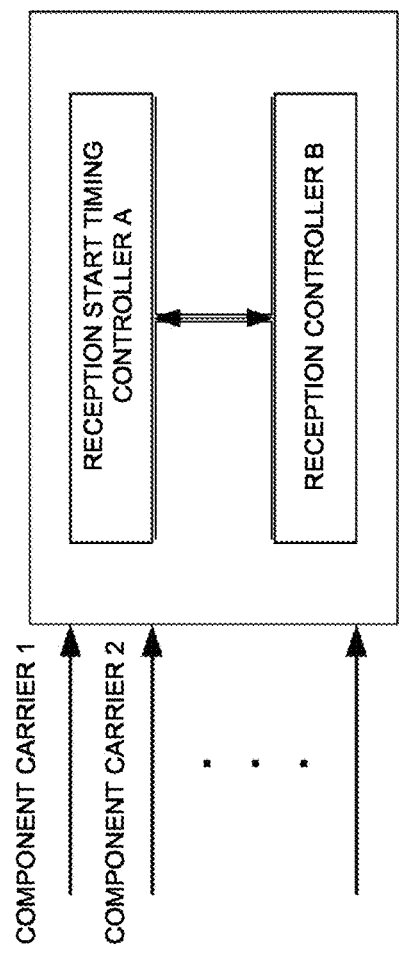
FIG. 26 is a view for explaining an outline of the present invention.

As shown in FIG. 26, the present invention is a radio communication system in which the radio terminal can communicate using a plurality of the component carriers each having a different frequency, and the above radio communication system includes a reception start timing controller A that commonly controls a cycle of a reception start timing for a predetermined channel among at least one (a) part of the component carriers assigned to the radio terminal, and a reception controller B that controls a reception period for the predetermined channel to be started from the reception start timing on at least one (a) part of the component carriers assigned to the radio terminal.

Herein, with regard to the component carrier, being a target of the control by the present invention, all component carriers assigned to the radio terminal may be controlled as a target of control, and a predetermined specific carrier may be controlled as a target of control. In addition, the component carriers assigned to the radio terminal may be divided into several sets to take a control for each set.

Additionally, the so-called component carrier assigned to the radio terminal is a component carrier having a possibility that the data for the above radio terminal is transmitted, which has been indicated (Configured or Activated) by the radio base station, and/or a component carrier on which the above radio terminal receives (or shall receive) a predetermined channel in order to receive the data. Further, it is also possible to call a plurality of the component carriers each having a different frequency a carrier set. In addition, it is also possible to think that the so-called communication is data transmission and/or data reception.

With regard to the cycle of the reception start timing, at least two cycles or more of the reception start timing each having a different cycle length are used, and one cycle of the reception start timing is used among the component carriers each of which is a control target.

Further, with regard to the selection of the cycle of the reception start timing, the cycle is desirably decided based on the total data reception frequency of the component carriers each of which is the control target.

Upon explaining one example, when the new data is not received for a predetermined period on at least one part of the component carriers assigned to the radio terminal, the reception start timing controller A transits to the cycle of the reception start timing which is longer than the current cycle of the reception start timing. This example will be explained by employing FIG. 27.

Figure 27:
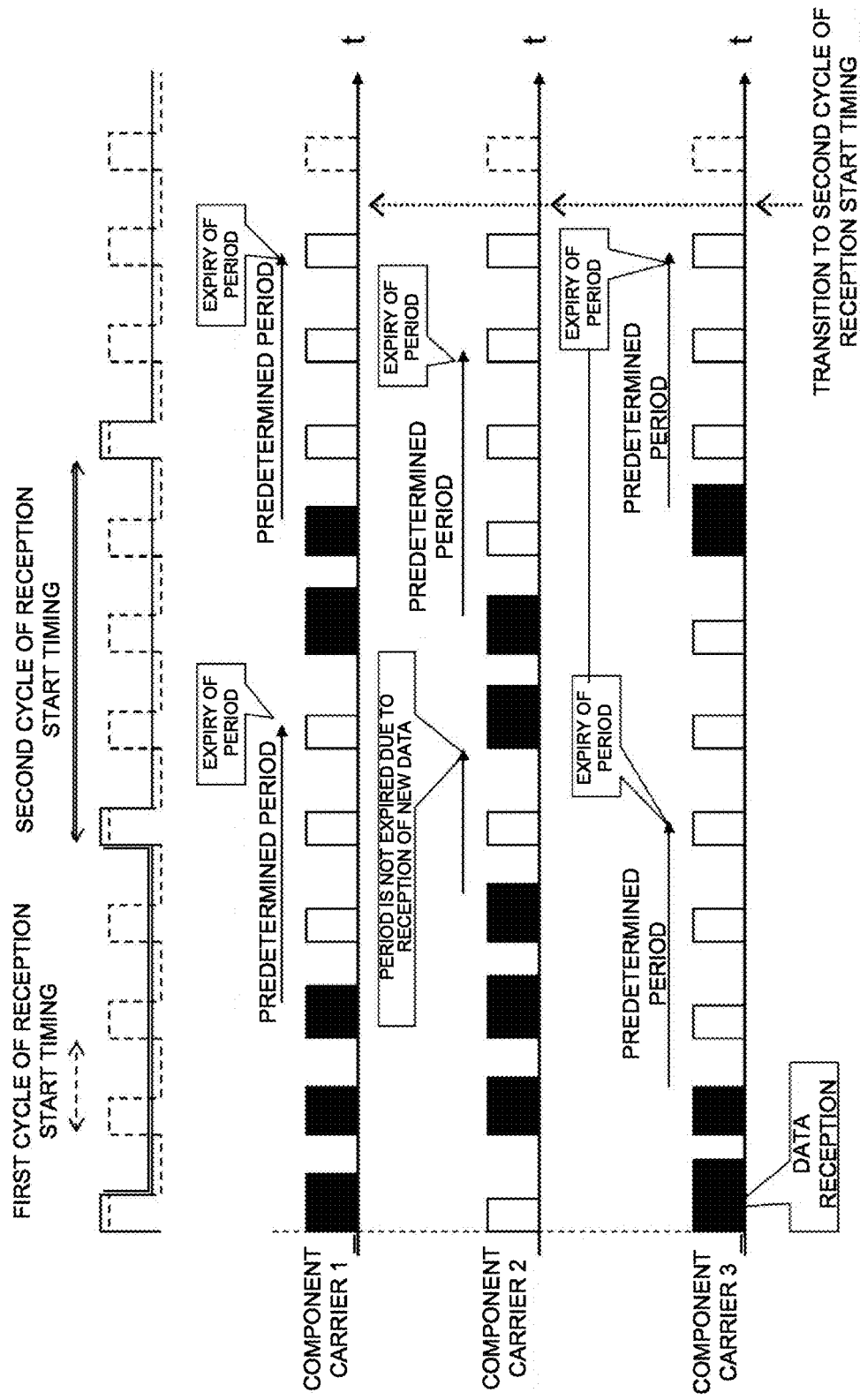
FIG. 27 is a view for explaining an outline of the present invention.

FIG. 27 illustrates that the control-target component carriers, out of the component carriers assigned to the radio terminal, are a component carrier 1, a component carrier 2, and a component carrier 3. And, each of the component carriers 1, 2, and 3 receives the signals to be transmitted in a predetermined channel either at the cycle of the first reception start timing or at the cycle of the second reception start timing which is longer than the cycle of this first reception start timing; however it is assumed that each of the component carrier 1, 2, and 3 firstly receives the signals to be transmitted in a predetermined channel at the cycle of the first reception start timing.

Further, with regard to each of the component carriers 1, 2, and 3, after receiving the data that is transmitted in a predetermined channel or the data that is transmitted correspondingly to the signals transmitted in a predetermined channel, for example, after the above data is successfully decoded, the measurement of a predetermined period is started. While this measurement is normally made with the timer etc., any kind timer, for example, a count-up timer and a count-down timer may be used so long as the predetermined expiry of the period can be grasped. In addition, the measurement may be started not after the data is successfully decoded, but after the retransmission control of the data (the reception processing in this case) is completed.

On the component carrier 1, the data is received at the first-place, the second-place, and the third-place cycles of the first reception start timing, and is not received for a predetermined period after the data received at the third-place cycle of the first reception start timing is successfully decoded. Likewise, on the component carrier 3, the data is received at the first-place and the second-place cycles of the first reception start timing, and is not received for a predetermined period after the data received at the second-place cycle of the first reception start timing is successfully decoded.

On the other hand, on the component carrier 2, the data is received at the second-place, the third-place, and the fourth-place cycles of the first reception start timing, and is received prior to expiry of a predetermined period after the data received at the fourth-place cycle of the first reception start timing is successfully decoded.

Thus, while the new data is not received for a predetermined period on the component carriers 1 and 3, the data is received prior to expiry of a predetermined period on the component carrier 2, whereby a transition to the cycle of the second reception start timings from the cycle of the first reception start timings is not carried out.

Continuously, on the component carrier 2, the data is received at the seventh-place cycle of the first reception start timing, and is not received for a predetermined period after the data received at the seventh-place cycle of the first reception start timing is successfully decoded. Likewise, on the component carrier 1, the data is received at the ninth-place cycle of the first reception start timing, and is not received for a predetermined period after the data received at the ninth-place cycle of the first reception start timing is successfully decoded. Likewise, on the component carrier 3, the data is received at the ninth-place cycle of the first reception start timing, and is not received for a predetermined period after the data received at the ninth-place cycle of the first reception start timing is successfully decoded.

Thus, the new data is not received for a predetermined period on all the component carriers 1, 2, and 3, whereby a transition to the cycle of the second reception start timing from the cycle of the first reception start timing is carried out.

In such a manner, the cycle of the reception start timing of a predetermined channel can be shared among the component carriers, and yet the power consumption of the radio terminal can be reduced.

Hereinafter, the exemplary embodiments of the present invention will be explained with a reference to the accompanied drawings. Additionally, in the following exemplary embodiments, "3GPP LTE (Long Term Evolution)" is expected as the radio communication system (cellular system).

< The Radio Communication System of the First Embodiment>

Figure 1:
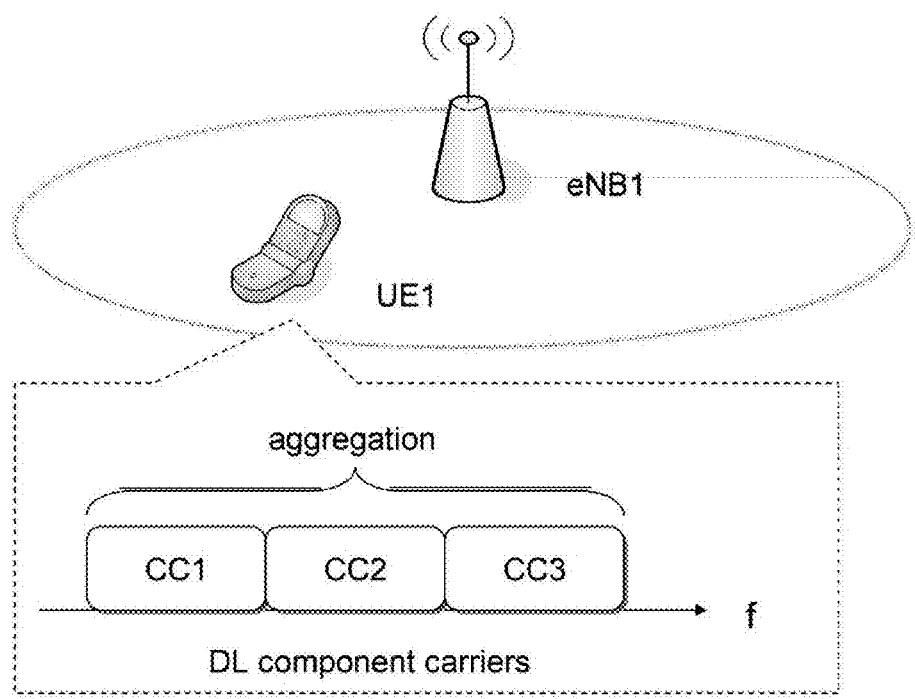
FIG. 1 is a view illustrating a configuration of a first radio communication system of a first exemplary embodiment of the present invention.

FIG. 1 is a view illustrating an example of a schematic configuration of the radio communication system of the first exemplary embodiment.

This radio communication system of the first exemplary embodiment includes a radio base station eNB1 (eNB: evolved NodeB) and a radio terminal UE1 (UE: User Equipment). Herein, the UE1 has completed a connection establishment (RRC Connection) for communicating with the eNB1. Further, the UE1 is assigned CC1 to CC3 as the component carrier capable of carrying out the carrier aggregation (CA: Carrier Aggregation), and is already in a state of being able to simultaneously receiving the data on the CC1 to the CC3. Additionally, each frequency of CC1 to CC3 may be continuous or discontinuous, and in addition, each frequency band may be identical or different. In addition, the eNB1 notifies a parameter of the discontinuous reception (DRX: Discontinuous Reception) to the UE1, and the UE1 carries out the necessary configuration (for example, setting of expiry values of the DRX-related timers, and the like) according to the above parameter. At this time, the parameter of the DRX is common to the CC1 to the CC3.

Figure 2:
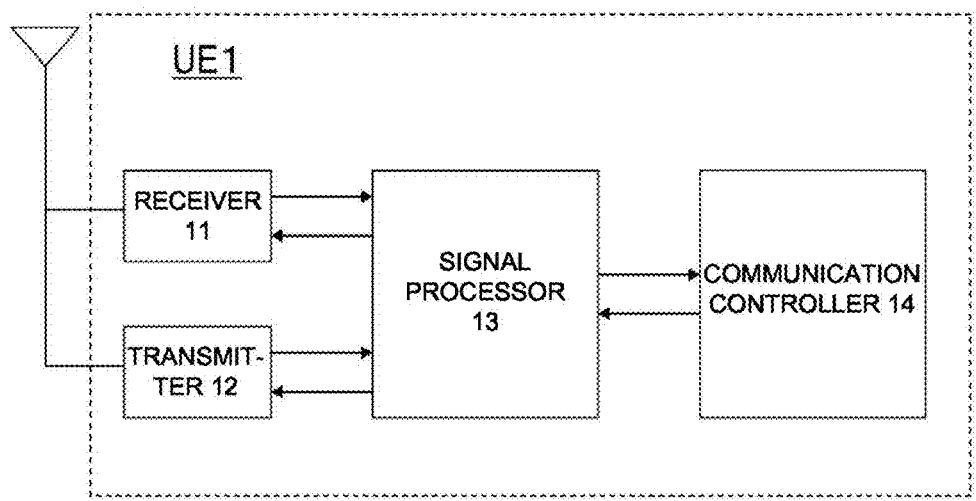
FIG. 2 is a block diagram of the radio terminal (UE) in the first example in accordance with the present invention.
Figure 3:
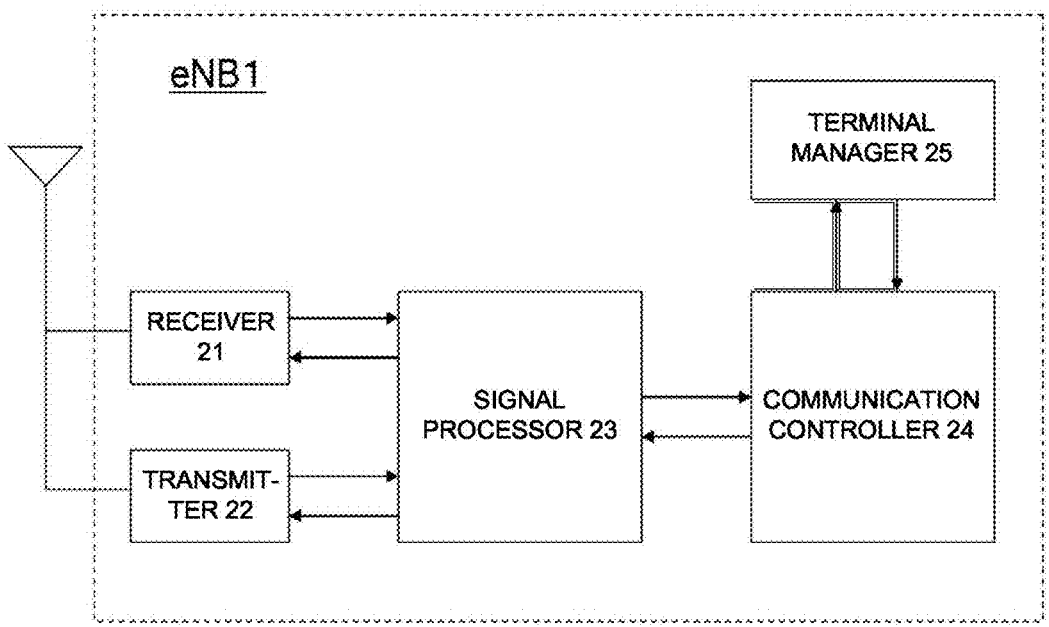
FIG. 3 is a block diagram of the radio base station (eNB) in the first example in accordance with the present invention.

FIG. 2 is a block diagram of the radio terminal (UE) in the radio communication system of the first exemplary embodiment, and FIG. 3 is a block diagram of the radio base station (eNB) of the first exemplary embodiment.

In FIG. 2, the UE1 is configured of a receiver 11, a transmitter 12, a signal processor 13, and a communication controller 14.

The receiver 11 and the transmitter 12 are a portion that receives/transmits radio signals from/to the eNB1, respectively. The signal processor 13 is a portion that generates the radio signals for transmitting certain information to the eNB, and recovers original information from the received radio signals. The communication controller 14 is a portion that gives an instruction for generation of transmission signals, recovery of information, and the like to the signal processor 13, and the DRX control of the UE is also managed by this communication controller 14.

In FIG. 3, the eNB1 is configured of a receiver 21, a transmitter 22, a signal processor 23, a communication controller 24, and a terminal manager 25. Basically, the receiver 21, the transmitter 22, the signal processor 23, and the communication controller 24 have a functionality similar to that of the UE1, respectively. Further, the terminal manager 25 manages each of a plurality of the UEs separately.

Figure 4:
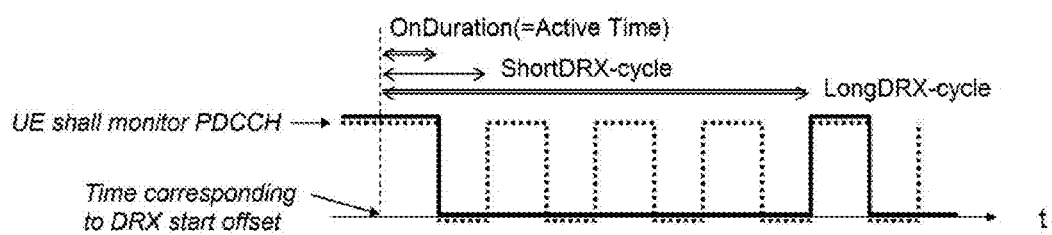
FIG. 4 is a view for explaining an operation of the discontinuous reception (DRX) of the radio terminal in the LTE.
Figure 5:
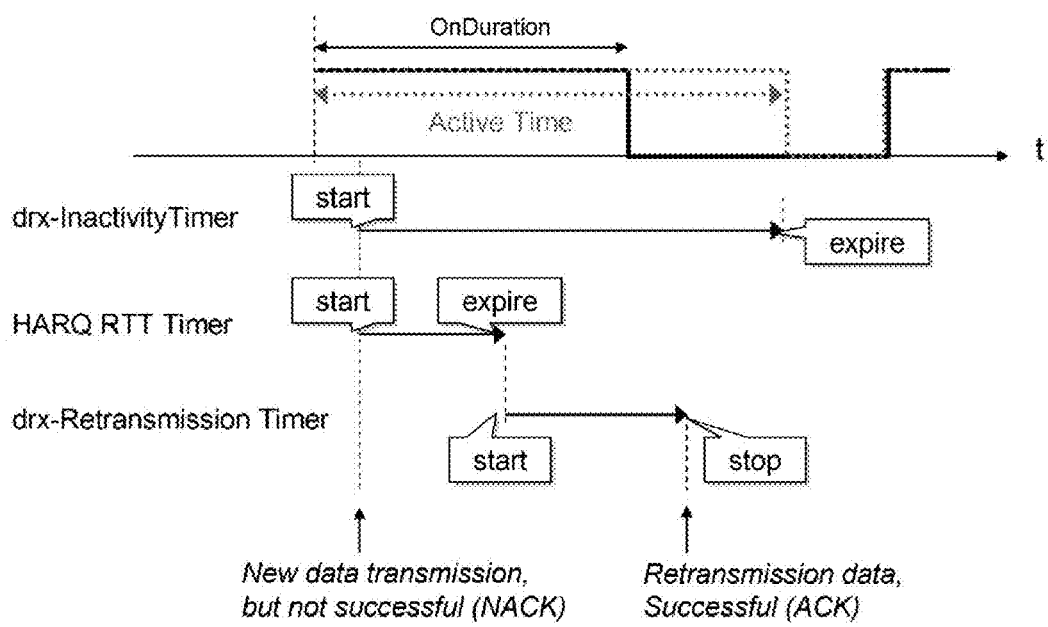
FIG. 5 is a view for explaining the Active Time in the DRX of the radio terminal in the LTE.
Figure 6:
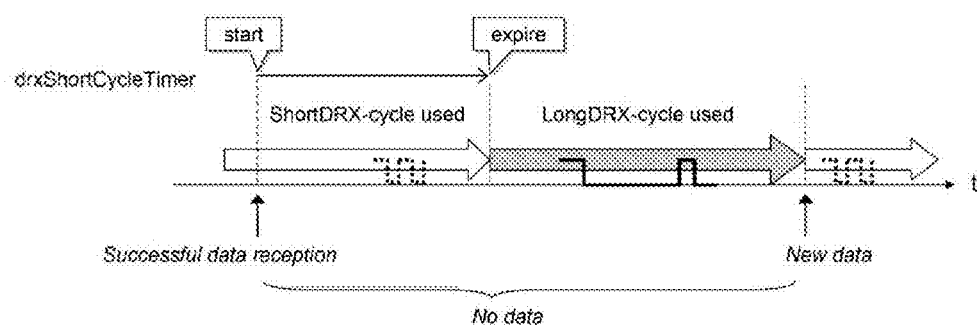
FIG. 6 is a view for explaining a DRX state transition of the radio terminal in the LTE.

Each of FIG. 4 to FIG. 6 is a view illustrating an operation of the discontinuous reception (DRX: Discontinuous Reception) of the radio terminal in the radio communication system of the first exemplary embodiment.

At first, as shown in FIG. 4, the DRX cycle, being a cycle of the discontinuous reception, is configured of the period (On-Duration) in which a downlink control channel PDCCH (Physical Downlink Control Channel) needs to be received continuously, and the period (Opportunity for DRX) in which the PDCCH does not need to be received. Additionally, the former is also called a Wake up period, and the latter is also called a Sleep period. Further, the latter could be a period in which the PDCCH is not received, or a period in which the reception of the PDCCH is prohibited.

Additionally, the data is transmitted in PDSCH (Physical Downlink Shared Chanel), and scheduling information of the PDSCH is contained in the PDCCH. Thus, after the PDCCH is received and the scheduling information is detected, the data indicated by it can be received.

Herein, the reception start timing of a predetermined channel is equivalent to the start timing of the On-Duration, and the cycle of the reception start timing of a predetermined channel is equivalent to the cycle of the start timing of the On-Duration. Further, the minimum value of the reception period of a predetermined channel is equivalent to the On-Duration.

In addition, the so-called reception of a predetermined channel may be mentioned in another word, namely, monitoring of the signals to be transmitted in a predetermined channel.

Further, there are two kinds for the DRX cycle, namely, ShortDRX and LongDRX. The ShortDRX and the LongDRX are identical to each other in the length of the On-Duration, and differ from each other in the length of the duration other than the On-Duration in which the PDCCH does not need to be received, and an interval of the On-Duration of the ShortDRX is set so that is becomes shorter than that of the LongDRX. Additionally, in the LTE, there is a constraint that the length of the LongDRX is an integral multiple of that of the ShortDRX. The length of the On-Duration and the length of the DRX cycle are specified in the Non-patent literature 4. For example, ten and several types of the lengths of the On-Duration can be set in a range from 1 ms to 200 ms, and ten and several types of the lengths of the DRX cycle can be set in a range from 2 ms (the ShortDRX is minimized) to 2560 ms (the LongDRX is maximized) with regard to the ShortDRX and the LongDRX, respectively.

Herein, in addition to the above-described examples, similarly to the On-Duration, the case of receiving not the downlink control channel such as the PDCCH but the downlink data channel such as the PDSCH (Physical Downlink Shared Channel) of the LTE in the duration in which the radio terminal is activated cyclically is also thinkable. For example, the case of receiving the PDSCH of a predetermined radio resource without using the PDCCH particularly at the time of the first-time transmission, as is the case with the successive resource assignment of the LTE (Semi-persistent scheduling), is one example thereof.

Basically, the DRX is controlled based on a plurality of the timers as shown in FIG. 5, and each timer is defined as described below (the Non-patent literature 2).

drx-InactivityTimer: Specifies the number of consecutive subframes (PDCCH-subframes) after successfully decoding a PDCCH indicating an initial UL (Uplink) or DL (Downlink) user data scheduling for the UE.

HARQ RTT Timer: This parameter specifies the minimum amount of subframes before a DL HARQ retransmission is expected by the UE.

drx-RetransmissionTimer: Specifies the maximum number of consecutive subframes for as soon as a DL retransmission is expected by the UE.

The length of each timer is specified in the Non-patent literature 2 and the Non-patent literature 4. For example, approximately twenty types of the lengths can be set in a range from 1 ms to 2560 ms with the drx-InactivityTimer, and several types can be set in a range from 1 ms to 33 ms with the drx-RetransmissionTimer. For the system of FDD (Frequency Division Duplex) the HARQ RTT Timer is set to 8 ms.

The DRX control employing these timers will be explained by employing FIG. 5.

At first, the UE, upon reception of the new DL data during the On-Duration, starts (restarts) the drx-InactivityTimer. Further, simultaneously therewith, the UE starts the HARQ RTT Timer. The UE starts the drx-RetransmissionTimer simultaneously with expiry of the HARQ RTT Timer when the DL data cannot be successfully decoded, (basically, the DL data is retransmitted before the drx-RetransmissionTimer expires). The UE stops the drx-RetransmissionTimer when the DL data is received and can be successfully decoded. And, the UE moves to the period (Opportunity for DRX) in which the PDCCH does not need to be received simultaneously with expiry of the drx-InactivityTimer.

Herein, in FIG. 5, the drx-RetransmissionTimer runs beyond the period of the On-Duration, and the UE successively receives the PDCCH beyond the On-Duration. This period in which UE successively receives the PDCCH is called Active Time, and the On-Duration is equivalent to the minimum value of the Active Time. Thus, the reception period of a predetermined channel is equivalent to the Active Time. Further, while the UE stops the drx-RetransmissionTimer when the retransmitted DL data can be successfully decoded, the UE may continue to activate the drx-RetransmissionTimer without stopping it. In this case, the UE extends the Active Time when either the drx-RetransmissionTimer or the drx-InactivityTimer is running, and moves to the period in which the PDCCH does not need to be received at a time point when that both timers expire. In such a manner, the UE determines whether to extend the Active Time in each DRX cycle, and behaves so as to be able to receive the DL data without a delay.

Next, the DRX state (DRX level) control will be explained by employing FIG. 6.

As described previously, the DRX has two DRX states that are called the ShortDRX and the LongDRX. Basically, the UE firstly starts from the ShortDRX and transits to the LongDRX after a certain period elapses. It is drxShortCycleTimer that is employed for determining a transition from this ShortDRX to the LongDRX, and the drxShortCycleTimer is defined as follows (the Non-patent literature 2).

drxShortCycleTimer: Specifies the number of consecutive subframes the UE shall follow the ShortDRX cycle.

FIG. 6 shows a situation in which the UE receives the DL data during the ShortDRX, and can successfully decode it at a certain time point. The UE starts (restarts) the drxShortCycleTimer at a time point when the DL data can be successfully decoded. When the UE receives the new data while the drxShortCycleTimer is running, it again restarts the drxShortCycleTimer at a time point when the above data can be successfully decoded.

On the other hand, when the UE does not receive the new data until the drxShortCycleTimer expires as shown in FIG. 6, it transits to the LongDRX from the ShortDRX. And, when the UE receives the new data after transiting to the LongDRX, it again transits to the ShortDRX from the LongDRX.

Additionally, in a case of mentioning the restart of the timer, the restart basically signifies the restart from an initial value; however, the present invention is applicable even though the restart of the timer is differently signified. For example, the case in which the timer stops temporarily, and thereafter, starts to run again from the above value of the stopping, and the like are thinkable.

Next, the DRX control method at the time of the CA in the radio communication system of the first exemplary embodiment will be explained.

At first, the radio communication system of the first exemplary embodiment independently performs operations (for example, extension of the Active Time) other than the DRX state control, out of a series of operations of the discontinuous reception (DRX) of the radio terminal (UE), respectively, and commonly takes the DRX state control on all the component carriers (CCs) or one part thereof. As shown in FIG. 1, when the UE1 can simultaneously use the CC1 to the CC3, the UE activates the drx-InactivityTimer, the HARQ RTT Timer, and the drx-RetransmissionTimer on each CC, and decides the Active Time. This makes it possible to realize a reduction in the power consumption of the UE according to the actual data reception on each CC at each the DRX cycle. On the other hand, the following three methods are thinkable as a method of controlling the DRX state.

1. Each CC has the drxShortCycleTimer, the drxShortCycleTimer is independently activated on each CC, and a transition to the LongDRX from the ShortDRX is carried out at a time point when the drxShortCycleTimers expire on all the CCs.
2. The CCs shares one drxShortCycleTimer, the drxShortCycleTimer is restarted when the CC receiving at least one piece of the data exists at each DRX cycle, and a transition to the LongDRX from the ShortDRX is carried out at a time point when the drxShortCycleTimer expires.
3. Each CC has the drxShortCycleTimer. In addition, the CCs have one separate timer (CA-drxShortCycleTimer) (common to the CCs). At first, the drxShortCycleTimer is independently activated on each CC. When the drxShortCycleTimer is started or restarted on any CC, the CA-drxShortCycleTimer is also started or restarted. And a transition to the LongDRX from the ShortDRX is carried out at a time point when the CA-drxShortCycleTimer expires.

These methods make it possible to realize the DRX state control based on not the data reception frequency of each CC but the total data reception frequency of each UE. Additionally, individually deactivating (Deactivation) the CCs that become unnecessary during the DRX control makes it possible to avoid the excessive power consumption of the terminal. Further, a transition to the ShortTDRX from the LongDRX is carried out in such a manner that a transition to the ShortDRX is carried out on all the CCs when the new data is received on any CC in the On-Duration of the longDRX. However, the transition is not limited hereto, and for example, the method in which, when the data is received at the consecutive N-time DRX cycles on a certain CC, all other CCs as well transit to the ShortDRX, the method in which, when the new data is received on the CCs of M or more, all other CCs as well transit to the ShortDRX, and the like are thinkable. However, the first-place method is preferred from a viewpoint of taking the DRX state control based on the total data reception frequency of the UE.

Additionally, while this radio communication system has a preferred configuration in accordance with a specification of the 3GPP LTE, the configuration is not limited hereto.

In such a manner, in accordance with this exemplary embodiment, the DRX state (DRX level) suitable for the data reception frequency can be maintained, and yet selection of the CC responding to a communication channel quality and a load such as a traffic can be realized while the power consumption is reduced when the radio terminal takes the control of the discontinuous reception (DRX) at the time of transmitting/receiving the data by simultaneously employing a plurality of the component carriers (Component Carrier: CC) each having a different frequency (Carrier Aggregation: CA).

First Example

Figure 7:
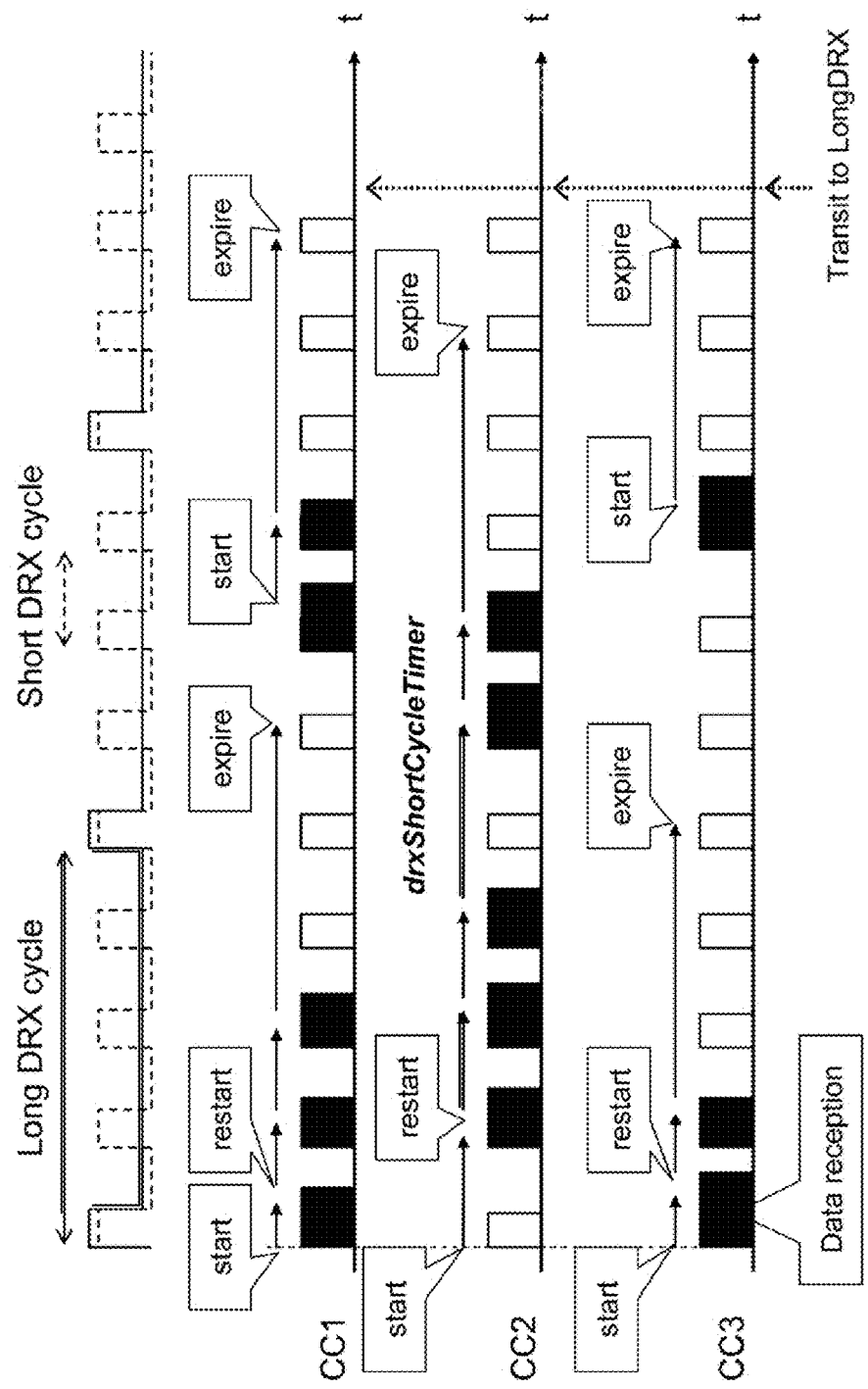
FIG. 7 is a view for explaining a DRX operation of the radio terminal in the first example in accordance with the present invention.

FIG. 7 is a view illustrating a situation of the DRX by CC of the radio terminal (UE), which explains the first example corresponding to the first exemplary embodiment.

In the example, the drxShortCycleTimer is activated on each CC, and a transition to the LongDRX from the ShortDRX is carried out at a time point when the drxShortCycleTimers expire on all the CCs. Herein, it is assumed that the terminal is firstly in a state of the ShortDRX, and the length of the drxShortCycleTimer is equivalent to three times that of the ShortDRX cycle.

The UE starts the drxShortCycleTimers on all the CCs at the first-place DRX cycle (the DRX cycle is counted in the ShortDRX). The data is not received on the CC2, whereby the CC2 moves to the non-reception period (Opportunity for DRX) after the PDCCH is received only in the On-Duration (after it is confirmed that no data is transmitted). On the other hand, on the CC1 and the CC3, the data is received, the Active times are extended from the On-Durations, respectively, and the drxShortCycleTimer is restarted at a time point when the data decoding is successfully carried out.

The data is received on all the CCs at the second-place DRX cycle, and the drxShortCycleTimer is restarted after the data reception is successfully carried out, respectively.

Next, upon paying attention to the fifth-place DRX cycle, it can be seen that the drxShortCycleTimer expires on the CC3. Conventionally, the CC3 transits to the LongDRX at this time point; however the ShortDRX is maintained without a transition to the LongDRX in the present invention.

Likewise, while the drxShortCycleTimer of the CC1 expires at the sixth-place DRX cycle, the ShortDRX is maintained uninterruptedly.

Upon paying attention to the seventh-place DRX cycle, the data is received on the CC1. Conventionally, the data cannot be received on the CC1 because the seventh-place DRX cycle is the timing of a transition to the LongDRX; however the data reception is possible in the first example because the ShortDRX is maintained uninterruptedly. In addition, the drxShortCycleTimer is started again at this time.

The situation is similar with the CC3 in the eighth-place DRX cycle.

Thereafter, after the ShortDRX is successively carried out on each CC, the drxShortCycleTimer expires on the CC2 at the tenth-place DRX cycle, and the drxShortCycleTimers expire on the CC1 and CC3 at the eleventh-place DRX cycle. For this reason, all the CCs transit to the LongDRX after the twelfth-place DRX cycle. Additionally, when the data is not received particularly after the drxShortCycleTimer temporarily expires on a certain CC and yet when the drxShortCycleTimers expire on all the other CCs, a transition to the LongDRX is possible at its time point.

Figure 8:
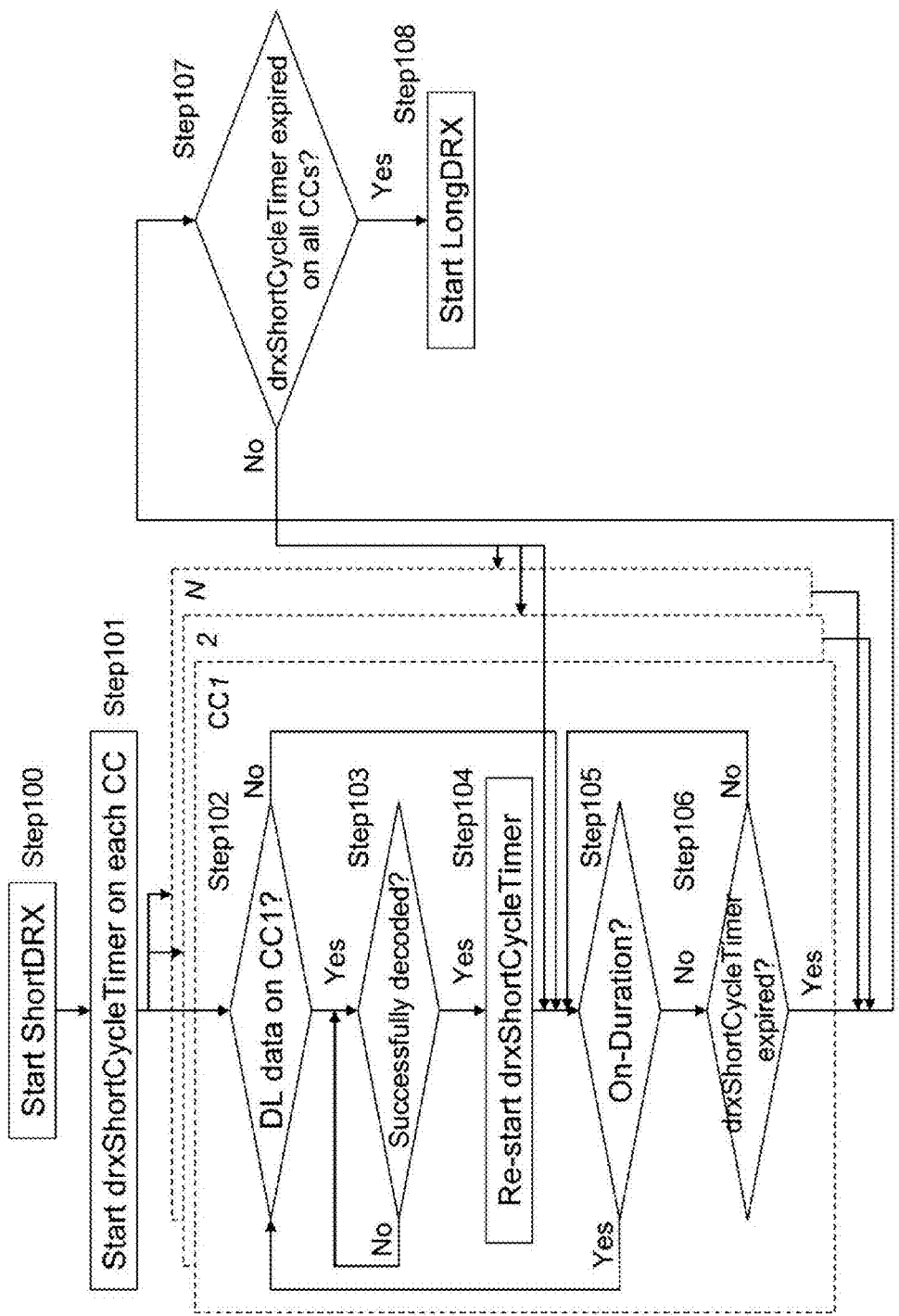
FIG. 8 is a flowchart of the radio terminal in the first example in accordance with the present invention.
Figure 9:
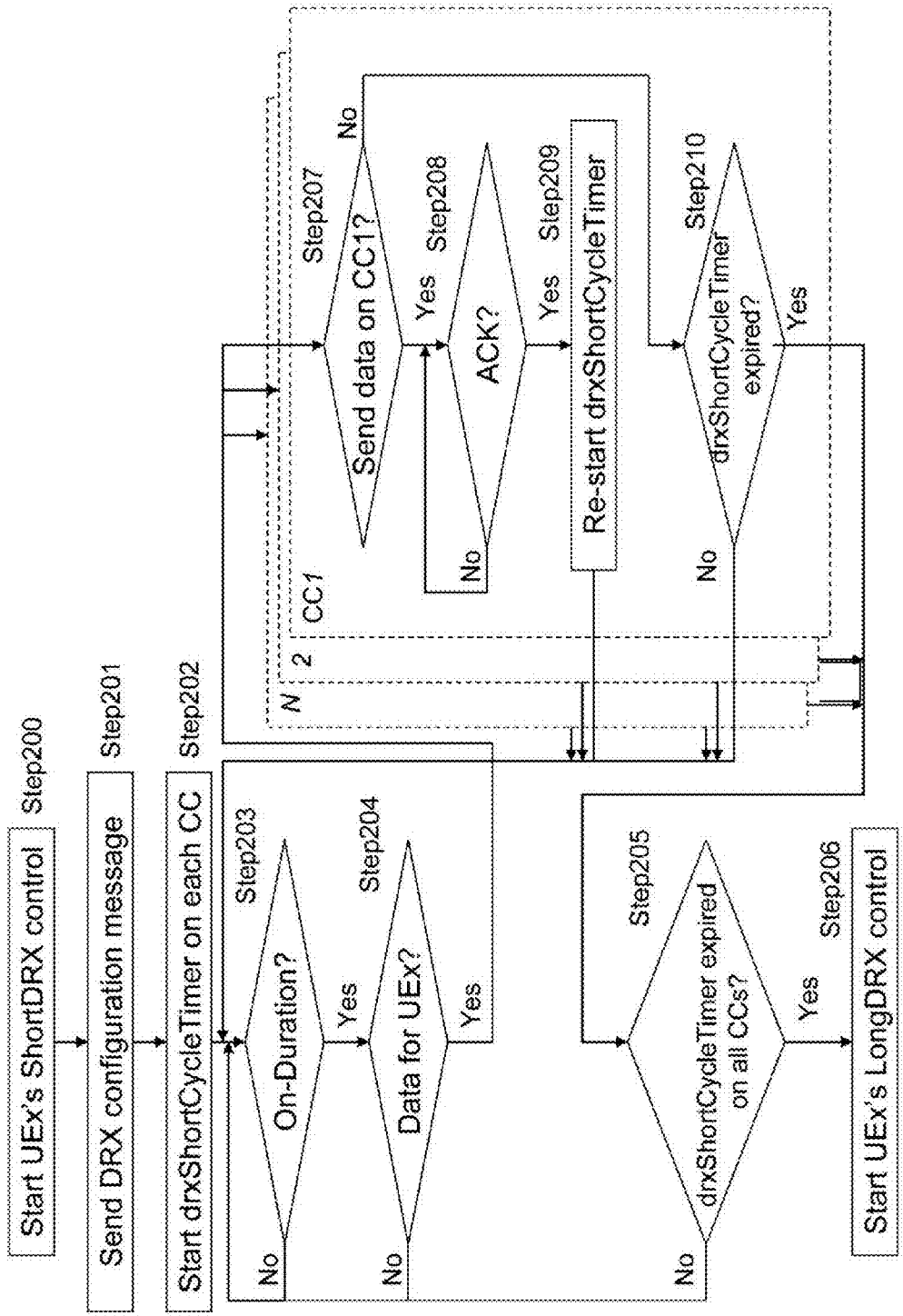
FIG. 9 is a flowchart of the radio base station in the first example in accordance with the present invention.

FIG. 8 is a view illustrating an operational flow of the communication controller 14 of the UE1 in this example, and FIG. 9 is a view illustrating an operational flow of the communication controller 24 of the eNB1 in this example.

In FIG. 8, the UE1 firstly initiates from the ShortDRX as the DRX state (DRX level) (Step 100), and starts the drxShortCycleTimer on each CC (Start drxShortCycleTimer on each CC) (Step 101).

The UE1 determines whether the downlink data (DL data) exists for each CC in the initial On-Duration (DL data on CCn?) (Step 102). Continuously, the UE1 determines whether the downlink data was able to be successfully decoded when the downlink data is received, (Successfully decoded?) (Step 103), and restarts the drxShortCycleTimer (Re-start drxShortCycleTimer) after it can be successfully decoded (or after the HARQ process is finished) (Step 104).

Likewise, the UE1 determines whether the downlink data exists in the On-Duration period (Step 105 and Step 102), performs the similar operation when it exists, and continues to activate the remaining drxShortCycleTimers without stopping them when it does not exist (Step 103 and Step 104). And, the UE1 determines whether the drxShortCycleTimer has expired for each CC (drxShortCycleTimer expired?) (Step 106).

When the drxShortCycleTimer has expired on a certain CC, the UE1 confirms whether the drxShortCycleTimers expired (have expired) on all the other CCs as well (drxShortCycleTimer expired on all CCs?) (Step 107), and repeats the similar operation when the drxShortCycleTimers have not expired yet on the other CCs. That is, when the downlink data is received, the UE1 restarts the drxShortCycleTimer after the downlink data can be successfully decoded (Restart). Additionally, the case of, when the drxShortCycleTimer has temporarily expired on a certain CC and yet the drxShortCycleTimers have not expired on the other CCs, receiving the downlink data again on the above CC should be referred to as not the start but the restart because the above timer is not running; however an acquisition result is identical. To the contrary, when the drxShortCycleTimers expire on all the CCs, the UE1 transits to the LongDRX (Start LongDRX) (Step 108).

Next, in FIG. 9, the communication controller 24 of the eNB1 starts the control of the ShortDRX for UEx (x=1, 2, . . . ,) (Start UEx's ShortDRX control) (Step 200).

At first, the communication controller 24 sends a DRX configuration message to the UEx (x=1, 2, . . . ,) (Send DRX configuration message)(Step 201), and starts the drxShortCycleTimer (Start drxShortCycleTimer on each CC) (Step 202).

Next, the communication controller 24 determines whether the UEx is in the On-Duration period (On-Duration?) (Step 203), and furthermore determines whether the data to be sent to the above UEx exists when it is in the On-Duration period (Data for UEx?) (Step 204). The communication controller 24 decides which CC is used for transmitting the data when sending the data, and proceeds to the subsequent operations for each CC.

The communication controller 24 firstly confirms whether to send the data for each CC (Send data on CCn?) (Step 207), and determines whether the data has been successfully decoded in the UE side, namely whether an acknowledge response (ACK) has been returned (or whether the HARQ has been finished) when transmitting the data (Step 208). When transmitting the data, the communication controller 24 confirms the reception of the acknowledge response, and thereafter, restarts the drxShortCycleTimer (Re-start drxShortCycleTimer) (Step 209). And, the communication controller 24 determines whether the drxShortCycleTimer has expired (drxShortCycleTimer expired?) (Step 210), and confirms whether the drxShortCycleTimers have expired also on all the other CCs when the drxShortCycleTimer expires (has expired) (drxShortCycleTimer expired on all CCs?) (Step 205). When the drxShortCycleTimers expire on all the CCs, the communication controller 24 judges that the above UEx transits to the LongDRX, and starts the LongDRX control (Start UEx's LongDRX control) (Step 206).

Herein, in the LTE, the initial On-Duration, namely, the timing for starting an operation of the drxShortCycleTimer is synchronized between the UE and the eNB with the predetermined method (equation of introducing a DRX start offset).

Additionally, while the case in which the similar processing method was performed in the UE1 and eNB1 was explained in this example, the similar processing method does not need to be performed in the UE1 and eNB1 so long as the acquired result is identical. For example, the method of this example may be employed for the UE, and the method to be later described may be employed for eNB, or vice versa.

In such a manner, in the first example, a reduction in the power consumption of the UE can be realized at each DRX cycle while the DRX state control suitable for the total data reception frequency of the UE is taken.

Further, employing this DRX control method makes the CC selection at the time of the CA flexible, which enables the CC selection responding to the communication channel quality and the load distribution between the CCs to be realized. For example, at the seventh-place and the eighth-place DRX cycles of FIG. 7, the drxShortCycleTimers expire on the CC1 and CC3, and conventionally, the CC1 and the CC3 cannot be used because the seventh-place and the eighth-place DRX cycles become the non-reception period (Opportunity for DRX) of the LongDRX, respectively. At this time, it might lead to deterioration in reception characteristics that the communication channel quality of the CC2 deteriorates, and yet is inferior as compared with that of the CC1 and CC3. Further, when a use rate of the CC2 is higher that of the CC1 and the CC3, namely a load to the CC2 is higher, the influence such as a decline in a throughput might be produced upon not only the above radio terminal but also the other radio terminals. However the present invention is capable of avoiding these situations.

Modified Example of the First Example

Figure 10:
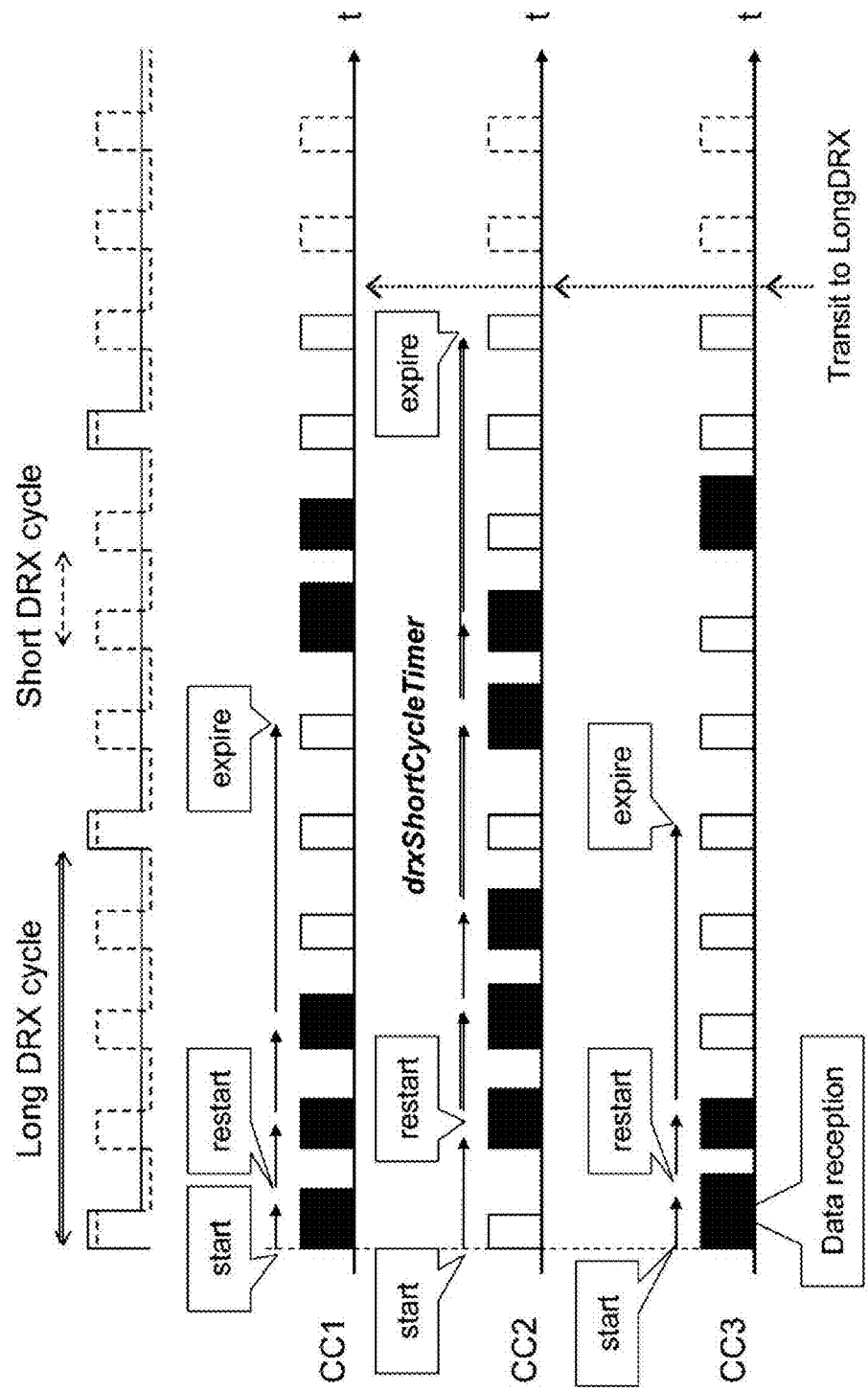
FIG. 10 is a view for explaining the DRX operation of the radio terminal in a modified example of the first example in accordance with the present invention.

FIG. 10 is a view for explaining a modified example of the first example of the present invention. In this example, similarity to the first example, the drxShortCycleTimer is activated on each CC, and a transition to the LongDRX from the ShortDRX is carried out at a time point when the drxShortCycleTimers expire on all the CCs.

A difference with the first example lies in a point that the drxShortCycleTimer is not started on the CC in which the drxShortCycleTimer has expired once even though the data is received after the expiry, until the above CC temporarily transits to the LongDRX, and comes into the ShortDRX again.

Upon paying attention to the sixth-place DRX cycle, the drxShortCycleTimer expires on the CC1, and conventionally, the CC1 transits to the LongDRX; however the ShortDRX is continued also on the CC1 in the present invention because the drxShortCycleTimers of the other CCs have not expired.

Next, upon paying attention to the seventh-place DRX cycle, the data is again received on the CC1; however the drxShortCycleTimer is not started again because the drxShortCycleTimer has expired once. This situation is similar with the CC3 at the eighth-place DRX cycle. And, a transition to the LongDRX is carried out at a time point when the drxShortCycleTimer of the CC2 having run to the end expires. Additionally, a configuration may be made in such a manner that the drxShortCycleTimer is started again when a certain condition is met also after the drxShortCycleTimer has expired once. For example, the case in which the data is received consecutively N times, the case in which the data is again received after T subframes without a transition to the LongDRX, and the like are thinkable.

It can be safely said that the method of the modified example of the first example is the aggressive DRX control method that aims at reducing the consumption power of the UE all the more as compared with the first example.

Second Example

Figure 11:
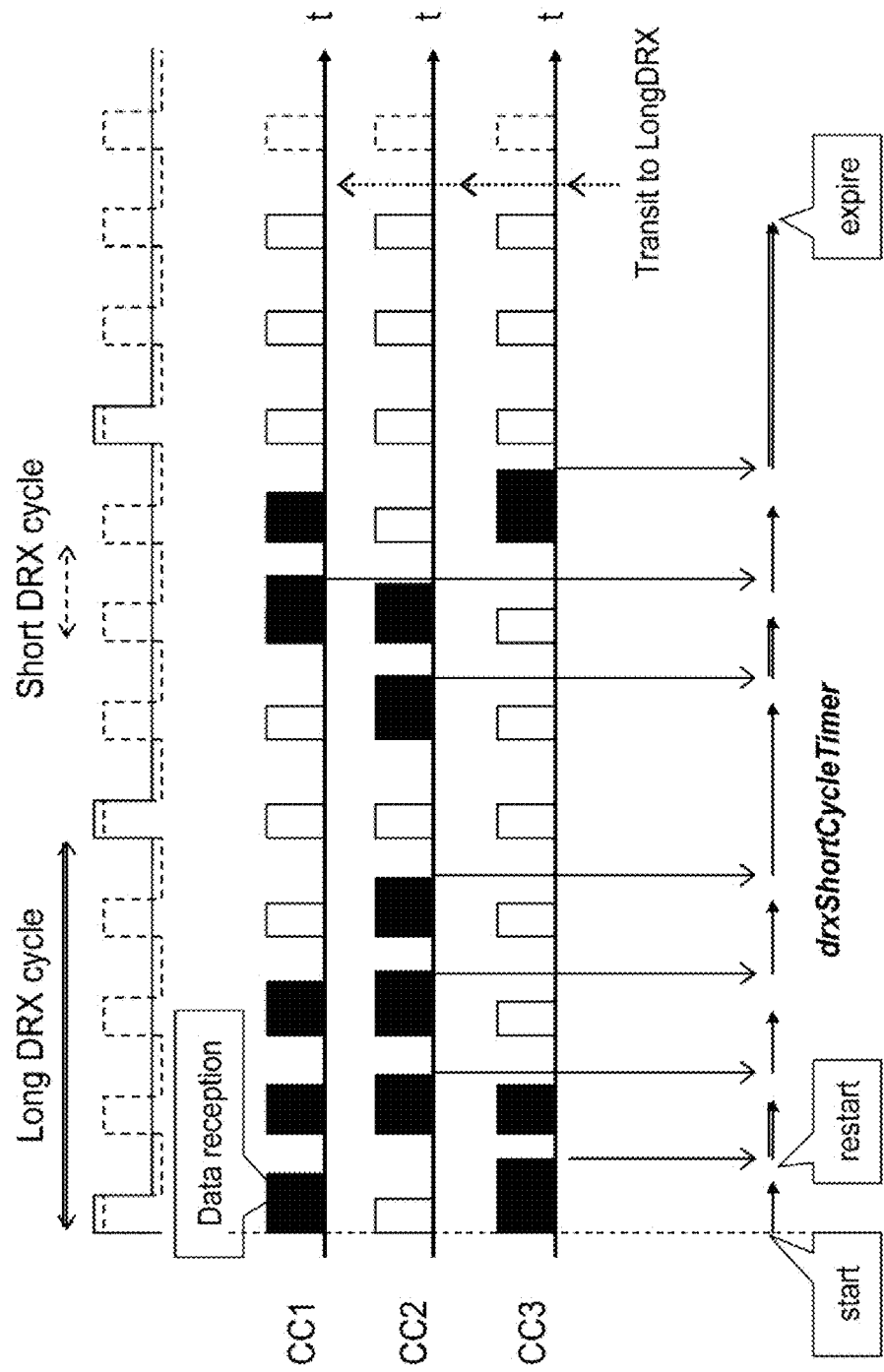
FIG. 11 is a view for explaining the DRX operation of the radio terminal in a second example in accordance with the present invention.

FIG. 11 is a view illustrating a situation of the DRX by CC of the radio terminal (UE), which explains the second example of the first exemplary embodiment.

In this example, the UE activates the drx-InactivityTimer, the drx-RetransmissionTimer, and the HARQ RTT Timer on each CC, and decides the Active Time; however, it commonly activates the drxShortCycleTimer among the CCs, and transits to the LongDRX from the ShortDRX at a time point when this drxShortCycleTimer expires. Herein, it is assumed that the UE is firstly in a state of the ShortDRX, and the length of the drxShortCycleTimer is equivalent to three times that of the ShortDRX cycle.

The UE firstly starts the drxShortCycleTimer at the first-place DRX cycle (the DRX cycle here is counted in the ShortDRX). In FIG. 11, the CC1 and the CC3 receive the data at the first-place DRX cycle, and the CC3 receives the data for a longer time than the CC1. Thereupon, the UE restarts the drxShortCycleTimer after the CC3 completes the data reception.

Next, the data is received on all the CCs at the second-place DRX cycle, and CC2 receives the data for a longest time, whereby the UE again restarts the drxShortCycleTimer after the CC2 completes the data reception. Likewise, the UE restarts the drxShortCycleTimer so as to match with the CC having received most newly, and waits for expiry of the Timer. In FIG. 11, after the last data is received at the eighth-place DRX cycle, the drxShortCycleTimer expires at the eleventh-place DRX cycle, and the UE transits to the LongDRX.

Figure 12:
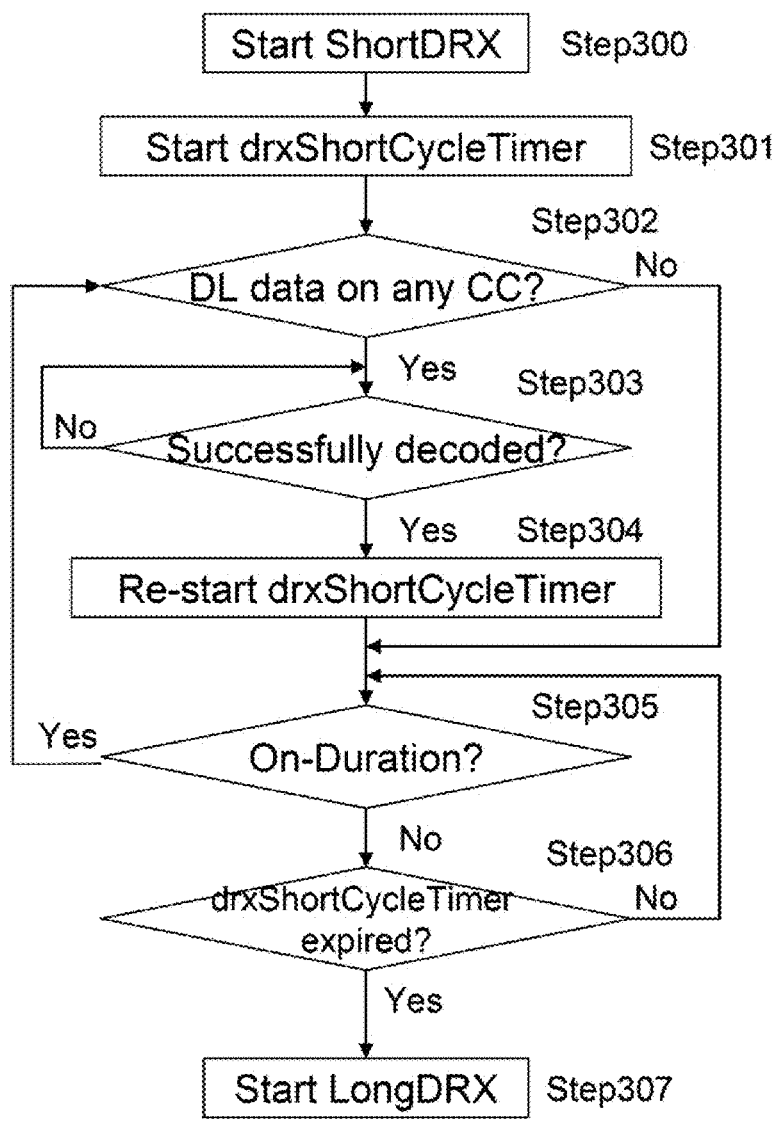
FIG. 12 is a flowchart of the radio terminal in the second example in accordance with the present invention.
Figure 13:
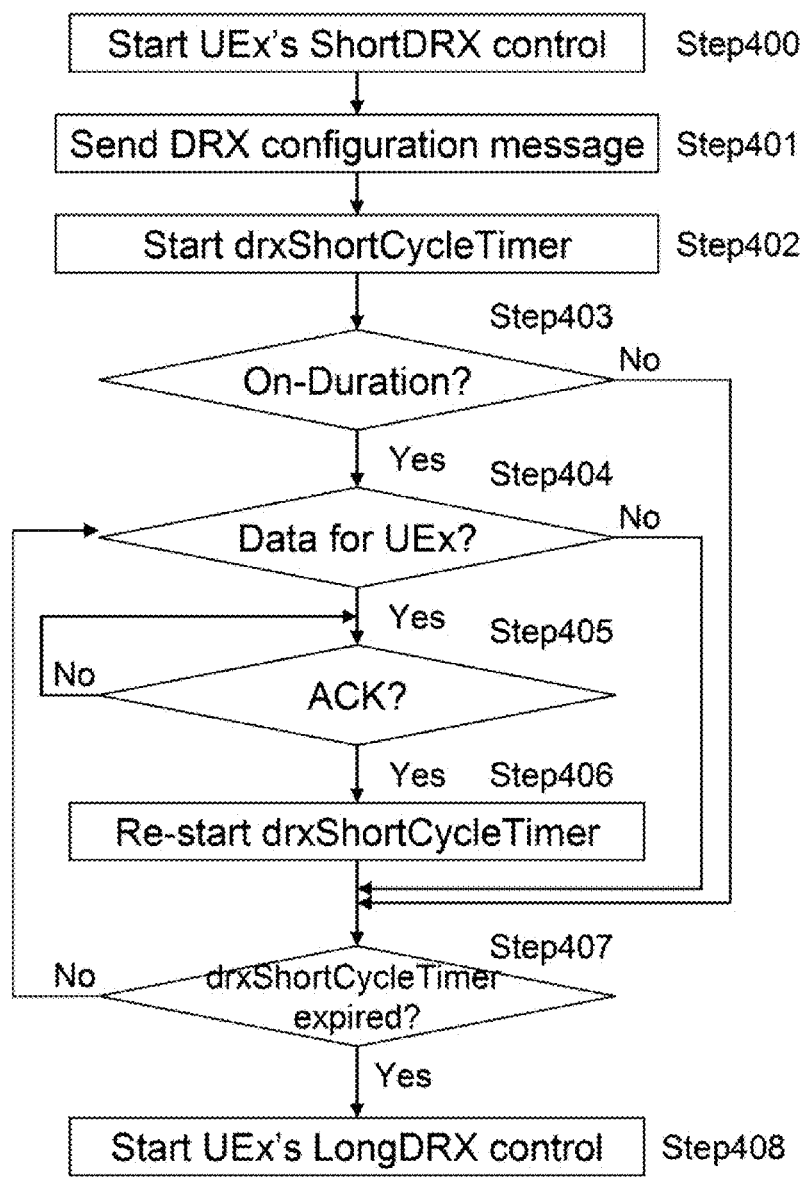
FIG. 13 is a flowchart of the radio base station in the second example in accordance with the present invention.

FIG. 12 is a view illustrating an operational flow of the communication controller 14 of the UE1 in this example, and FIG. 13 is a view illustrating an operational flow of the communication controller 14 of the eNB1 in this example.

In FIG. 12, the communication controller 14 of the UE1 firstly initiates from the ShortDRX as the DRX state (DRX level) (Step 300), and starts the drxShortCycleTimer (Start drxShortCycleTimer) (Step 301).

The communication controller 14 determines whether the downlink data exists on any CC in the initial On-Duration (DL data on any CC?) (Step 302), and determines whether the downlink data was able to be successfully decoded (or the HARQ process has been finished) when the downlink data is received (Successfully decoded?) (Step 303).

The communication controller 14 restarts the drxShortCycleTimer after the downlink data can be successfully decoded (or after the HARQ process is finished) (Re-start drxShortCycleTimer) (Step 304). Likewise, the communication controller 14 determines whether the downlink data exists in the On-Duration period, performs the similar operation when it exists, and continue to activate the remaining drxShortCycleTimers without stopping them when it does not exist. And, the communication controller 14 determines whether the drxShortCycleTimer has expired (drxShortCycleTimer expired?) (Step 306), and transits to the LongDRX when it expires (has expired) (Start LongDRX) (Step 307).

Next, in FIG. 13, the communication controller 24 of the eNB1 starts the control of the ShortDRX for the UEx (x=1, 2, . . . ,) (Start UEx's ShortDRX control) (Step 400).

At first, the communication controller 24 sends the DRX configuration message to the UEx (Send DRX configuration message) (Step 401), and starts the drxShortCycleTimer (Step 402).

The communication controller 24 determines whether the UEx is in the On-Duration period (On-Duration?) (Step 403), and furthermore determines whether the data to be sent to the above UEx exists when the UEx is in the On-Duration period (Data for UEx?) (Step 404). The communication controller 24 determines whether the data has been successfully decoded in the UE side, namely whether an acknowledge response (ACK) has been returned (or whether the HARQ process has been finished) when the data is transmitted (ACK?) (Step 405).

The communication controller 24 restarts the drxShortCycleTimer after confirming the reception of the acknowledge response (Re-start drxShortCycleTimer) (Step 406). And, the communication controller 24 determines whether the drxShortCycleTimer has expired (drxShortCycleTimer expired?) (Step 407), and judges that the above UEx transits to the LongDRX when the drxShortCycleTimer expires (has expired), and starts the LongDRX control (Start UEx's LongDRX control) (Step 408).

An effect by this example, similarly to the first example, is that a reduction in the power consumption of the UE can be realized in each DRX cycle while the DRX state control suitable for the data reception frequency of the UE is taken. Further, employing this DRX control method makes the CC selection in the case of CA flexible, which enables the CC selection according to the communication channel quality and the load distribution between the CCs to be realized. While the data reception situation (Active Time) needs to be shared among the CCs at each DRX cycle, this example has an advantage of making the number of the timers to be handled small as compared with the first example.

Third Example

Figure 14:
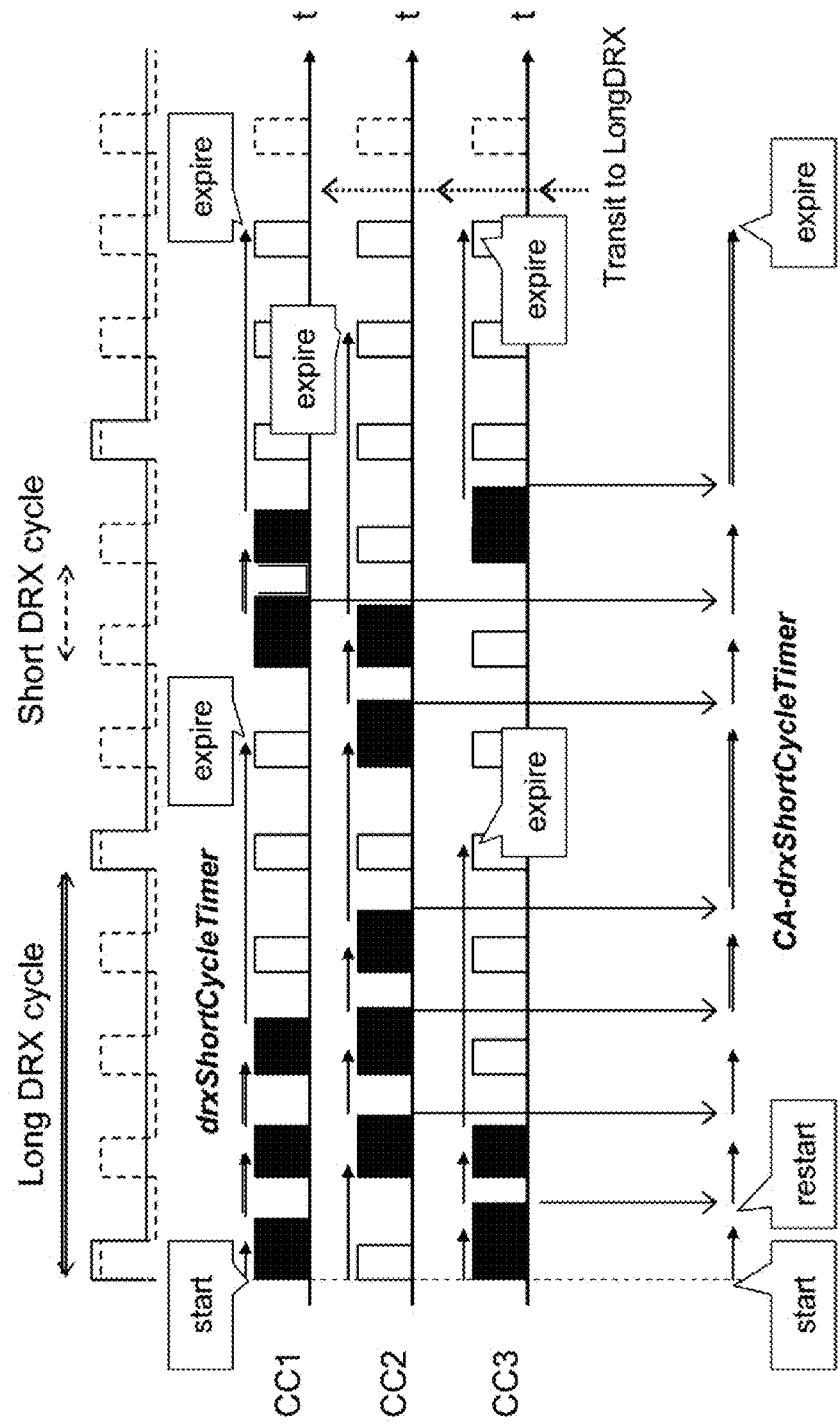
FIG. 14 is a view for explaining the DRX operation of the radio terminal in a third example in accordance with the present invention.

FIG. 14 is a view illustrating a situation of the DRX by CC of the radio terminal (UE), which explains the third example of the first exemplary embodiment.

In this example, the UE activates the drx-InactivityTimer, the drx-RetransmissionTimer, and the HARQ RTT Timer on each CC, decides the Active Time, and activates the drxShortCycleTimer. In addition, the UE employs CA-drxShortCycleTimer linked to this drxShortCycleTimer, and transits to the LongDRX from the ShortDRX at a time point when the CA-drxShortCycleTimer expires. Herein, it is assumed that the UE is firstly in a state of the ShortDRX, and the length of the drxShortCycleTimer and the length of CA-drxShortCycleTimer is equivalent to three times that of the ShortDRX cycle, respectively.

The UE firstly starts the drxShortCycleTimers at the first-place DRX cycle (the DRX cycle is counted in the ShortDRX) on all the CCs, and starts the CA-drxShortCycleTimer as well simultaneously therewith. In FIG. 14, the CC1 and the CC3 receives the data at the first-place DRX cycle, and the CC3 receives the data for a longer time than the CC1. Thereupon, the UE restarts the CA-drxShortCycleTimer after the CC3 completes the data reception.

Next, all the CCs receive the data at the second-place DRX cycle, and the CC2 receives the data for the longest time, whereby the UE restarts the CA-drxShortCycleTimer again after the CC2 completes the data reception. Likewise, the UE restarts the drxShortCycleTimer so as to match with the CC having received the data most newly, and waits for expiry of the Timer. Additionally, while the drxShortCycleTimer of the CC3 has expired at the fifth-place DRX cycle and the drxShortCycleTimer of the CC1 has expired at the sixth-place DRX cycle, the CA-drxShortCycleTimer has not expired yet, namely, there exists the CC (CC2) in which the drxShortCycleTimer has not expired, whereby the ShortDRX is successively maintained on the CC1 and CC3 as it stands. In addition, when the data is received newly on CC1 and CC3, the UE starts the drxShortCycleTimer again. In FIG. 14, the drxShortCycleTimers expire on all the CCs at the eleventh-place DRX cycle, and thus, the CA-drxShortCycleTimer also expires, and the UE transits to the LongDRX.

An effect by this example as well, similarly to the first example, is that a reduction in the power consumption of the UE can be realized at each DRX cycle while the DRX state control suitable for the data reception frequency of the UE is taken. Further, employing this DRX control method makes the CC selection at the time of the CA flexible, which enables the CC selection according to the communication channel quality and the load distribution between the CCs to be realized. As compared with the first example, this example needs to have one timer newly; however this example has an advantage that it is enough for determining the DRX state control based one timer (the CA-drxShortCycleTimer). Additionally, while it was assumed that the length of the drxShortCycleTimer and that of the CA-drxShortCycleTimer were identical to each other, they may differ from each other.

Figure 15:
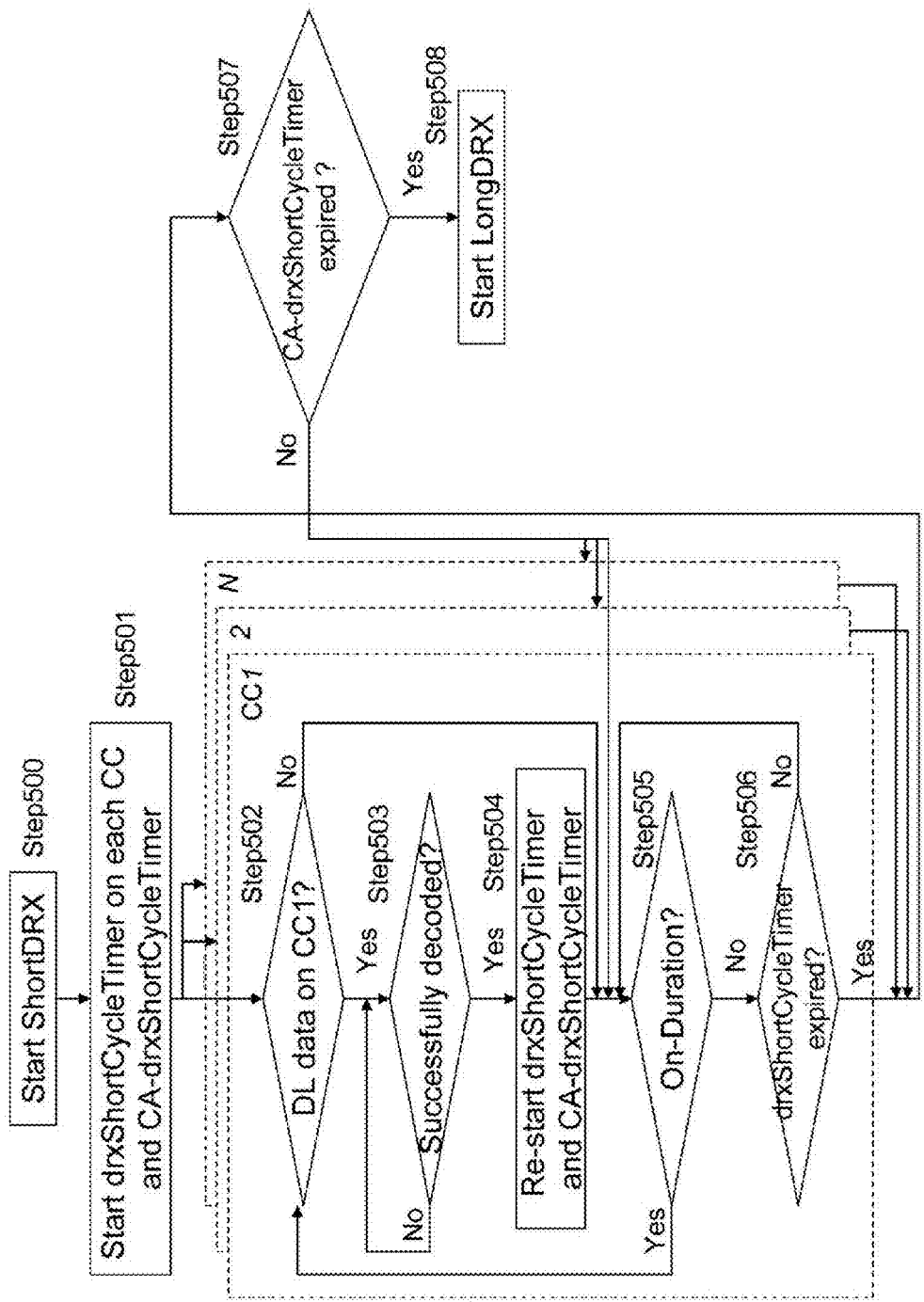
FIG. 15 is a flowchart of the radio terminal in the third example in accordance with the present invention.
Figure 16:
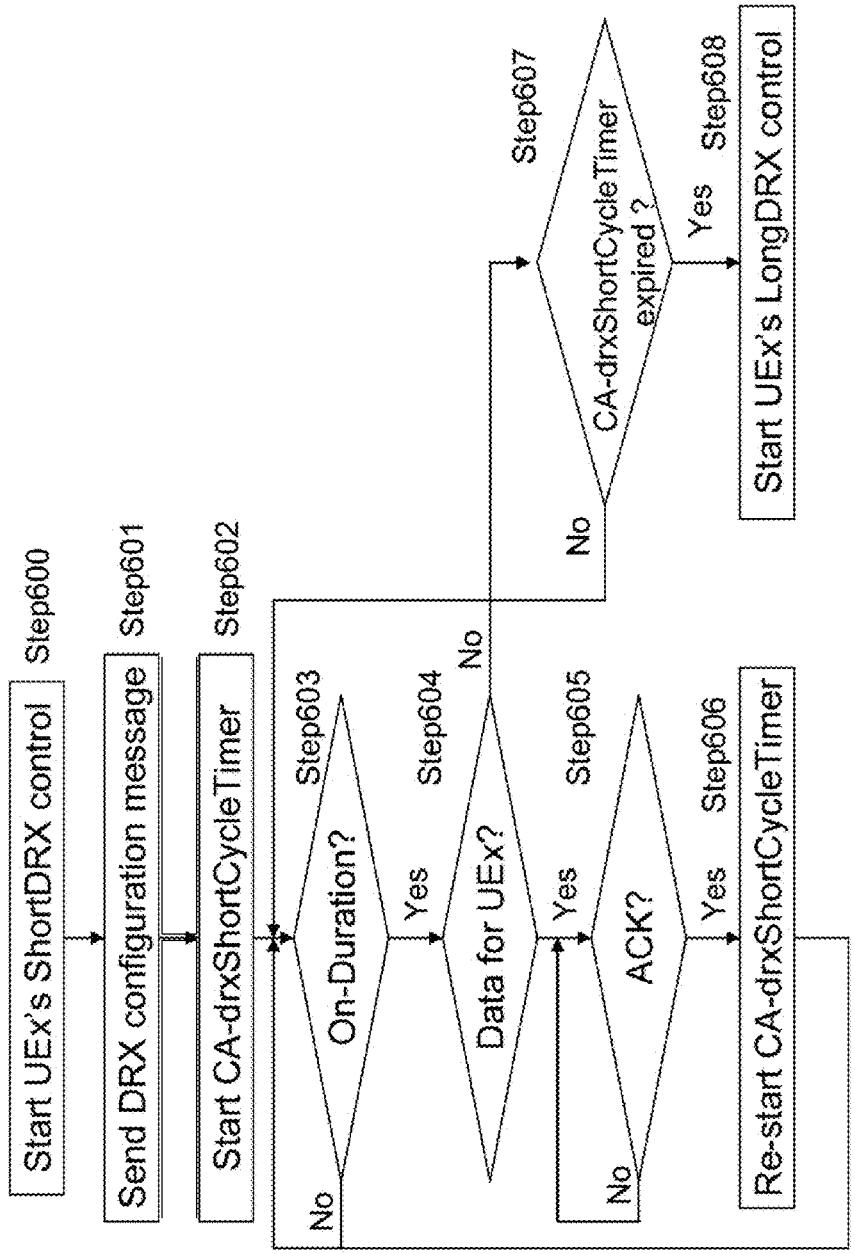
FIG. 16 is a flowchart of the radio base station in the third example in accordance with the present invention.

FIG. 15 is a view illustrating an operational flow of the communication controller 14 of the UE1 in this example, and FIG. 16 is a view illustrating an operational flow of the communication controller 14 of the eNB1 in this example.

In FIG. 15, the UE firstly initiates from the ShortDRX as the DRX state (DRX level) (Step 500), starts the drxShortCycleTimer on each CC, and in addition, starts one CA-drxShortCycleTimer (Start drxShortCycleTimer on each CC and CA-drxShortCycleTimer) (Step 501).

The UE determines whether the downlink data (DL data) exists for each CC in the initial On-Duration (DL data on CCn?) (Step 502), determines whether the downlink data was able to be successfully decoded (Successfully decoded?) when the downlink data is received (Step 503), and restarts the drxShortCycleTimer of each CC and the CA-drxShortCycleTimer after the downlink data can be successfully decoded (or the HARQ process is finished) (Re-start drxShortCycleTimer and CA-drxShortCycleTimer) (Step 504).

Likewise, the UE determines whether the downlink data exists in the On-Duration period (Step 505), performs the similar operation when it exists, and continues to activate the remaining drxShortCycleTimers without stopping them when it does not exist. And, the UE determines whether the drxShortCycleTimer has expired for each CC (drxShortCycleTimer expired?) (Step 506). When the drxShortCycleTimer has expired on a certain CC, the UE confirms whether the CA-drxShortCycleTimer expired (has expired) (CA-drxShortCycleTimer expired?) (Step 507), and repeats the similar operation when it has not expired. On the contrary, the UE transits to the LongDRX when the CA-drxShortCycleTimer has expired (Start LongDRX) (Step 508).

Next, in FIG. 16, the communication controller 24 of the eNB1 starts the control of the ShortDRX for the UEx (x=1, 2, . . . ,) (Start UEx's ShortDRX control) (Step 600).

At first, the eNB1 sends the DRX configuration message to the UEx (Send DRX configuration message) (Step 601), and starts the CA-drxShortCycleTimer (Start CA-drxShortCycleTimer (Step 602).

The eNB1 determines whether the UEx is in the On-Duration period (On-Duration?) (Step 603), and furthermore determines whether the data to be sent to the above UEx exists when the UEx is in the On-Duration period (Data for UEx?) (Step 604). When the eNB1 transmits the data, it determines whether the data has been successfully decoded in the UE side, namely whether an acknowledge response (ACK) has been returned (or whether the HARQ process has been finished) (ACK?) (Step 605).

The eNB1 restarts the CA-drxShortCycleTimer after confirming the reception of the acknowledge response (Re-start CA-drxShortCycleTimer) (Step 606).

And, the eNB1 returns to the Step 603, determines whether the UEx is in the On-Duration period (On-Duration?) (Step 603), and furthermore determines whether the data to be sent to the above UEx exists when the UEx is in the On-Duration period (Data for UEx?). When the data is not transmitted, the eNB1 determines whether the CA-drxShortCycleTimer has expired (CA-drxShortCycleTimer expired?) (Step 607), judges that the above UEx transits to the LongDRX when the CA-drxShortCycleTimer expires (has expired), and starts the control of the LongDRX (Start UEx's LongDRX control) (Step 608).

Modified Example of the Third Example

Figure 17:
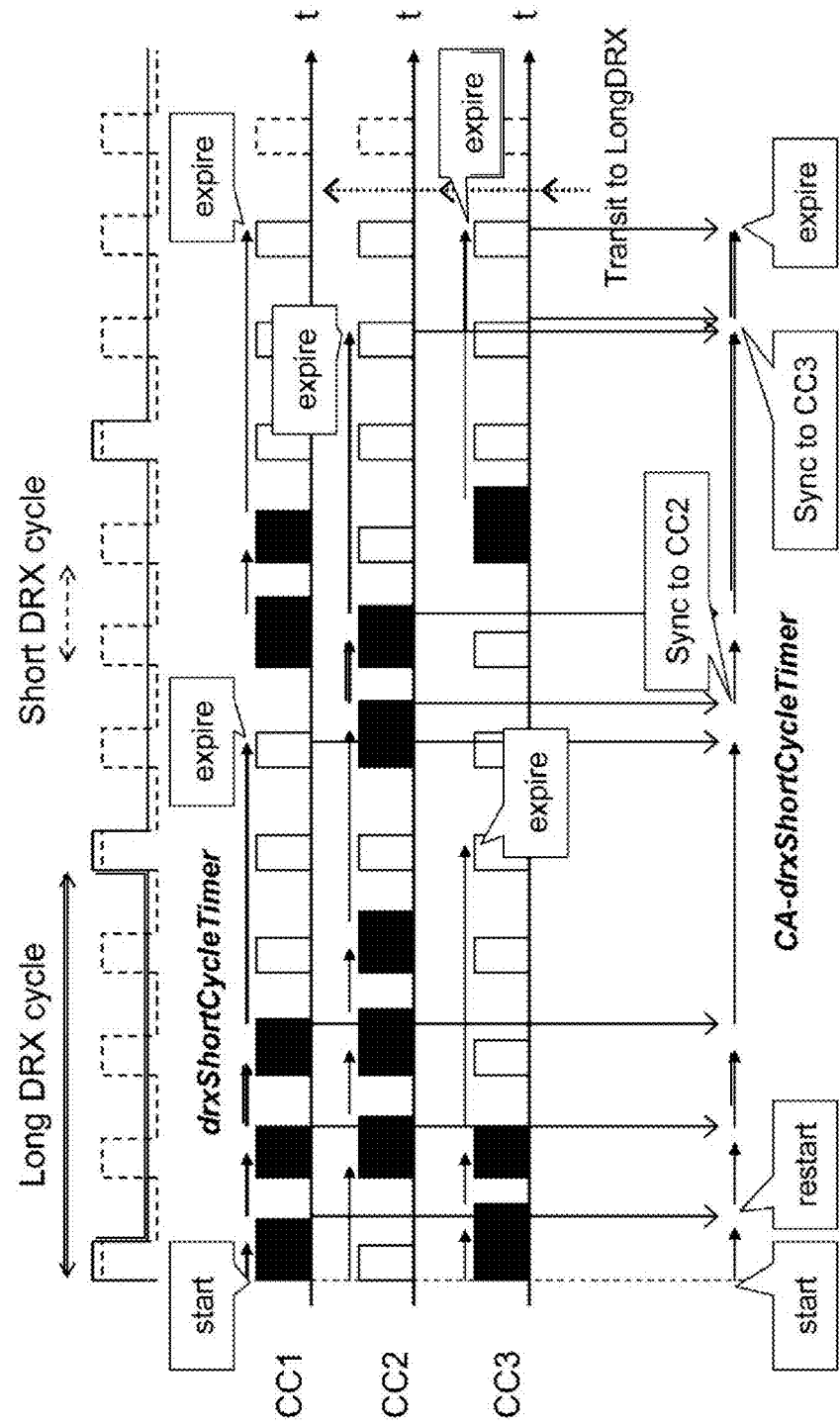
FIG. 17 is a view for explaining the DRX operation of the radio terminal in a modified example of the third example in accordance with the present invention.

FIG. 17 is a view for explaining a modified example of the third example of the first exemplary embodiment.

In this example, similarly to the third example, the UE activates the drx-InactivityTimer, the drx-Retransmission-Timer, and the HARQ RTT Timer on each CC, decides the Active Time, and activates the drxShortCycleTimer. In addition, the UE employs the CA-drxShortCycleTimer linked to this drxShortCycleTimer, and transits to the LongDRX from the ShortDRX at a time point when the CA-drxShortCycleTimer expires. A difference with the third example lies in a point of basically linking the CA-drxShortCycleTimer to the drxShortCycleTimer on one CC, out of a plurality of the CCs, and activating it.

The UE firstly starts the drxShortCycleTimers at the first-place DRX cycle (the DRX cycle is counted in the ShortDRX) on all the CCs, and starts the CA-drxShortCycleTimer as well simultaneously therewith. In FIG. 17, the CC1 and the CC3 receive the data at the first-place DRX cycle, and the UE links the CA-drxShortCycleTimer to the drxShortCycleTimer of the CC1, and activates the CA-drxShortCycleTimer herein as an example. The data is also received on the CC1 at the second-place DRX cycle, and the drxShortCycleTimer is restarted. For this, the CA-drxShortCycleTimer is also restarted likewise.

Next, the drxShortCycleTimer of the CC1 expires at the sixth-place DRX cycle. Thereupon, the UE confirms whether the drxShortCycleTimers are running on the other CCs (the CC2 and the CC3). In FIG. 17, the UE synchronizes the CA-drxShortCycleTimer with the drxShortCycleTimer of the CC2 because the drxShortCycleTimer of CC2 is still running.

On the other hand, while the drxShortCycleTimer of the CC2 and the CA-drxShortCycleTimer expire at the tenth-place DRX cycle, the drxShortCycleTimer of the CC3 is still running, whereby the UE re-synchronizes the CA-drxShortCycleTimer with the drxShortCycleTimer of the CC3. And, the UE transits to the LongDRX because the drxShortCycleTimer of the CC3 and the CA-drxShortCycleTimer expire at the eleventh-place DRX cycle, and no CC in which the drxShortCycleTimer is running exits.

This modified example, as compared with the third example, has an advantage that it is easy to update the CA-drxShortCycleTimer.

< The Radio Communication System of the Second Exemplary Embodiment>

Figure 18:
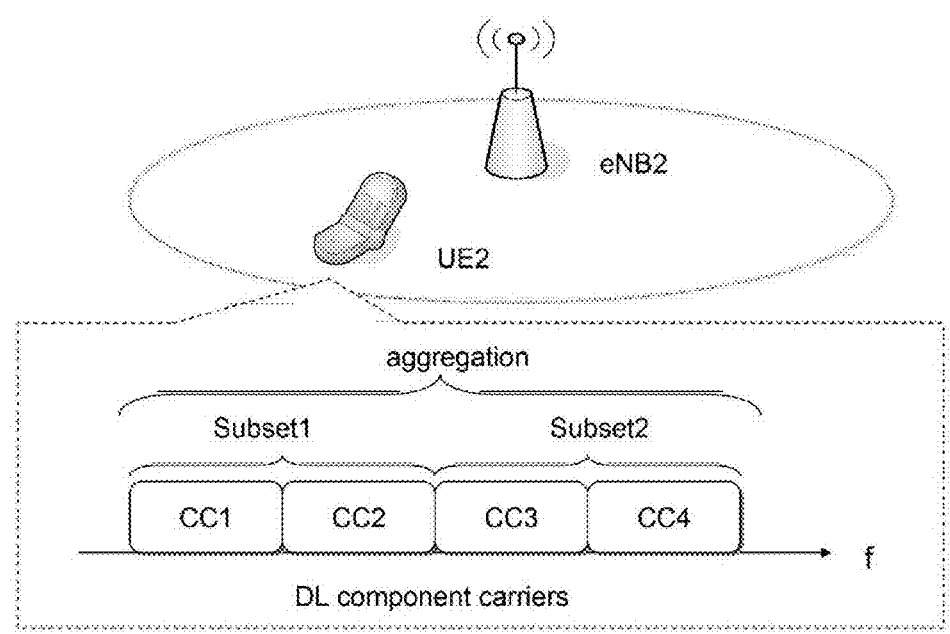
FIG. 18 is a view illustrating a configuration of a second radio communication system of another exemplary embodiment of the present invention.

FIG. 18 is a view illustrating an example of a schematic configuration of the radio communication system of the second exemplary embodiment.

This radio communication system of the second exemplary embodiment includes a radio base station eNB2 and a radio terminal UE2. Herein, the UE2 has completed a connection establishment (RRC Connection) for communicating with the eNB2. Further, the UE2 is assigned CC1 to CC4 as the Component Carrier (CC) capable of carrying out the Carrier Aggregation (CA), and is in a state of being able to simultaneously receive the data on the CCs 1 to 4. Additionally, each frequency of CC1 to CC4 may be continuous or discontinuous, and in addition, each frequency band of CC1 to CC4 may be identical or different. In addition, the eNB2 notifies a parameter of the DRX to the UE2, and the UE2 carries out the necessary setting (for example, the setting of expiry values of the DRX-related timers, and the like) according to the above parameter. Herein, an example of this exemplary embodiment in the second radio communication system shows the case in which the CC1 and the CC2 (subset1), and the CC3 and the CC4 (subset2) operate as a pair, respectively. As a factor that this Subset is configured (even though there is no ground that the Subset has to be configured without fail), the case in which services basically differ among the Subsets (FTP, VoIP, Streaming, etc.), the case in which frequency bands differs among the Subsets, the case in which a cell coverage differs among the Subsets, the types of the CC differ (for example, the type that can be used commonly to all Release versions, the type that can be used after a specific Release version, the type that can be used only under a specific condition, and the like) and the like are thinkable. At this time, the parameter of the DRX may be common to the CC1 to the CC4, and the parameter may be common within the identical Subset, and may be different Subset by Subset.

Next, the DRX control at the time of the CA in the radio communication system of the second exemplary embodiment will be explained.

As shown in FIG. 18, when the UE2 can simultaneously use the CC1 to the CC4, the UE2 activates the drx-InactivityTimer, the HARQ RTT Timer, and the drx-RetransmissionTimer on each CC, and decides the Active Time. This makes it possible to realize a reduction in the power consumption of the UE responding to the actual data reception on each CC at each DRX cycle. Additionally, as a method of controlling the DRX state, the method is employed of controlling the DRX state in such a manner that the DRX state may differ Subset by Subset with the DRX state within the Subset of the CC kept identical. As the detailed operation, the following three operations are thinkable.

1. Each CC has the drxShortCycleTimer, the drxShortCycleTimer is independently activated on each CC, and at a time point when the drxShortCycleTimers expire on all the CCs within the Subset, all the CCs within the above Subset transit to the LongDRX from the ShortDRX.
2. The CCs within the Subset share one drxShortCycleTimer, the drxShortCycleTimer is restarted when there is at least one CC having received the data at each DRX cycle, and all the CCs within the above Subset transit to the LongDRX from the ShortDRX at a time point when the drxShortCycleTimer expires.
3. Each CC has the drxShortCycleTimers. In addition, each Subset has one separate timer (CA-drxShortCycleTimer) (common to the CCs). At first, the drxShortCycleTimer is independently started on each CC. When the drxShortCycleTimer is started or restarted on any CC, the CA-drxShortCycleTimer is also started or restarted. And, all the CCs within the above Subset transit to the LongDRX from the ShortDRX at a time point when the CA-drxShortCycleTimer expires.

These methods make it possible to realize the DRX state control based on not the data reception frequency of each CC but the total data reception frequency within the Subset of each UE. These methods, as mentioned above, are effective in the case in which the service differs among the Subset, the case in which the frequency band differs, and the like.

Additionally, while this radio communication system has a preferred configuration in accordance with a specification of the 3GPP LTE, the configuration is not limited hereto.

Fourth Example

Figure 19:
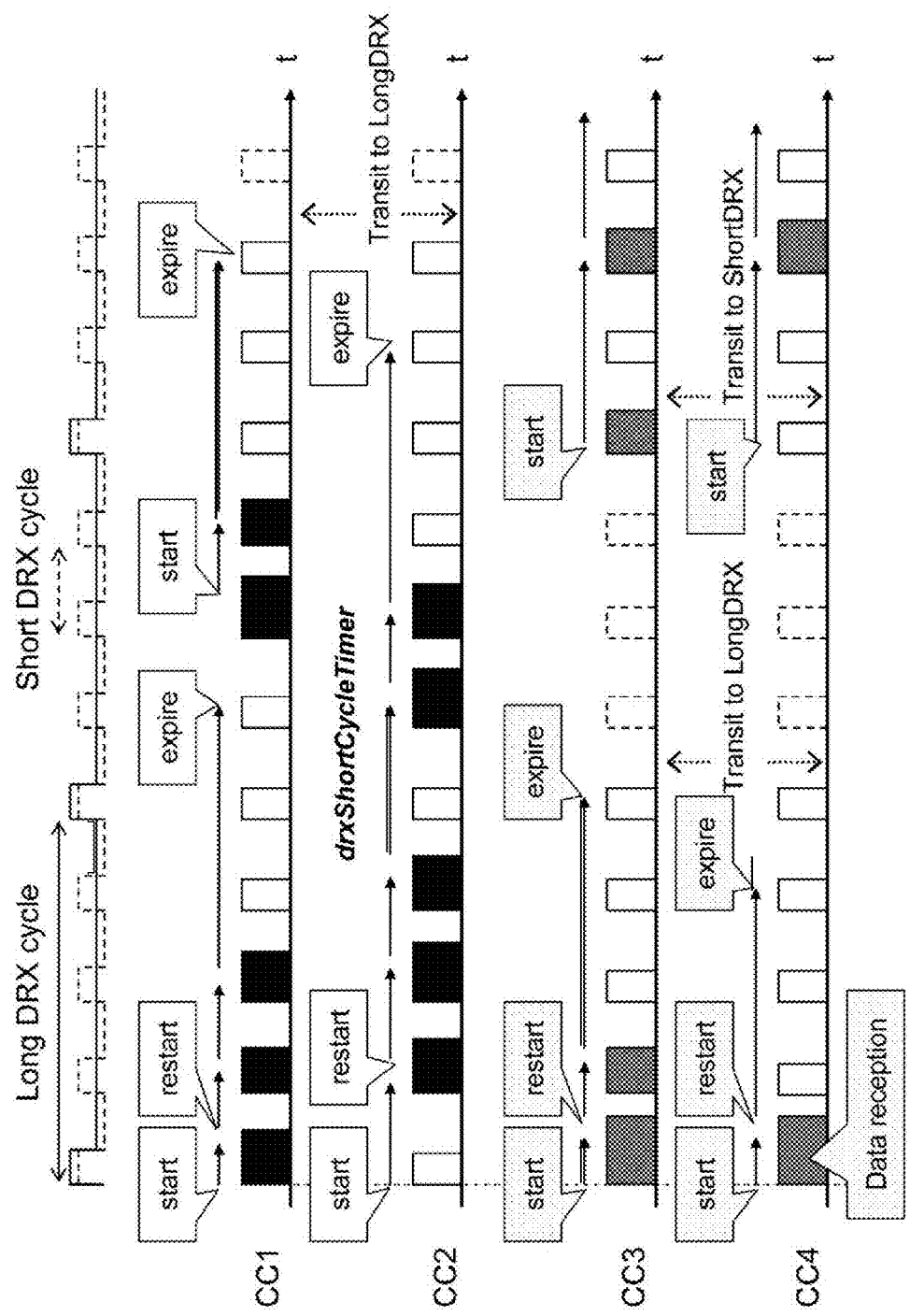
FIG. 19 is a view for explaining the DRX operation of the radio terminal in a fourth example in accordance with the present invention.

FIG. 19 is a view illustrating a situation of the DRX by CC of the radio terminal (UE), which explains the fourth example of the second exemplary embodiment.

Further, in the example, the UE activates the drxShortCycleTimer on each CC, it transits to the LongDRX from the ShortDRX at a time point when the drxShortCycleTimers expire on all the CCs within the Subset. Herein, it is assumed that the terminal is firstly in a state of the ShortDRX, and the length of the drxShortCycleTimer is equivalent to three times that of the ShortDRX cycle. Additionally, it is assumed that the DRX parameter is common to all the CCs.

At first, attention is paid to the CC1 and CC2 (the Subset1). The UE starts the drxShortCycleTimers on both CCs at the first-place DRX cycle (the DRX cycle is counted in the ShortDRX). The CC2 moves to the non-reception period (Opportunity for DRX) after receiving the PDCCH only in the On-Duration because the data is not received on the CC2.

On the other hand, on the CC1, the data is received, the Active time is extended from the On-Duration, and the drxShortCycleTimer is restarted at a time point when the data decoding is successfully carried out.

Next, upon paying attention to the sixth-place DRX cycle, it can be seen that the drxShortCycleTimer expires on the CC1. Conventionally, the CC1 transits to the LongDRX at this time point; however, the ShortDRX is maintained in this example.

Further, the data is received on the CC1 at the seventh-place DRX cycle. Conventionally, the data cannot be received on the CC1 because this period is a period of transition to the LongDRX; however the data reception is possible in this example because the ShortDRX is maintained as it stands. Additionally, at this time, the drxShortCycleTimer is started again on the CC1. Thereafter, after the ShortDRX is successively carried out on each CC, the drxShortCycleTimer of the CC2 expires at the tenth-place DRX cycle and the drxShortCycleTimer of the CC1 expires at the eleventh-place DRX cycle, respectively. For this reason, all the CCs within the Subset1 transit to the LongDRX since the twelfth-place DRX cycle. Additionally, when the data is not received particularly after the drxShortCycleTimer temporarily has expired on a certain CC, and yet when the drxShortCycleTimers have expired on all the other CCs, a transition to the LongDRX is possible at its time point.

Next, attention is paid to the CC3 and CC4 (the Subset2). The basic operation is identical to that of the Subset1. The drxShortCycleTimers are firstly started on both of the CC3 and CC4 at the first-place DRX cycle. Herein, the drxShortCycleTimers are started after the data reception is completed because the data is received on both. And, after the drxShortCycleTimer of the CC4 expires at the fourth-place DRX cycle, the drxShortCycleTimer of the CC3 expires at the fifth-place DRX cycle. Thus, at this time point, the CCs of the Subset2 transit to the LongDRX from the ShortDRX.

On the other hand, both of the CC3 and the CC4 transit to the ShortDRX from the LongDRX because the data is received on the CC3 at the next LongDRX cycle. And, the drxShortCycleTimers are started, respectively.

This brings about the case in which the DRX state of the Subset1 (CC1 and CC2) differs from that of the Subset2 (CC3 and CC4). For example, while the DRX state of the Subset1 is the ShortDRX at the sixth-place to the eighth-place DRX cycles, the DRX state of the Subset2 is the LongDRX.

In such a manner, taking the DRX state control for each Subset in this example makes it possible to realize a reduction in the power consumption of the UE at each DRX cycle while taking the DRX state control suitable for the data reception frequency by each Subset. Further, employing this DRX control method makes the CC selection at the time of the CA flexible, which enables the CC selection according to the communication channel quality and the load distribution between the CCs to be realized.

< The Radio Communication System of the Third Embodiment>

Figure 20:
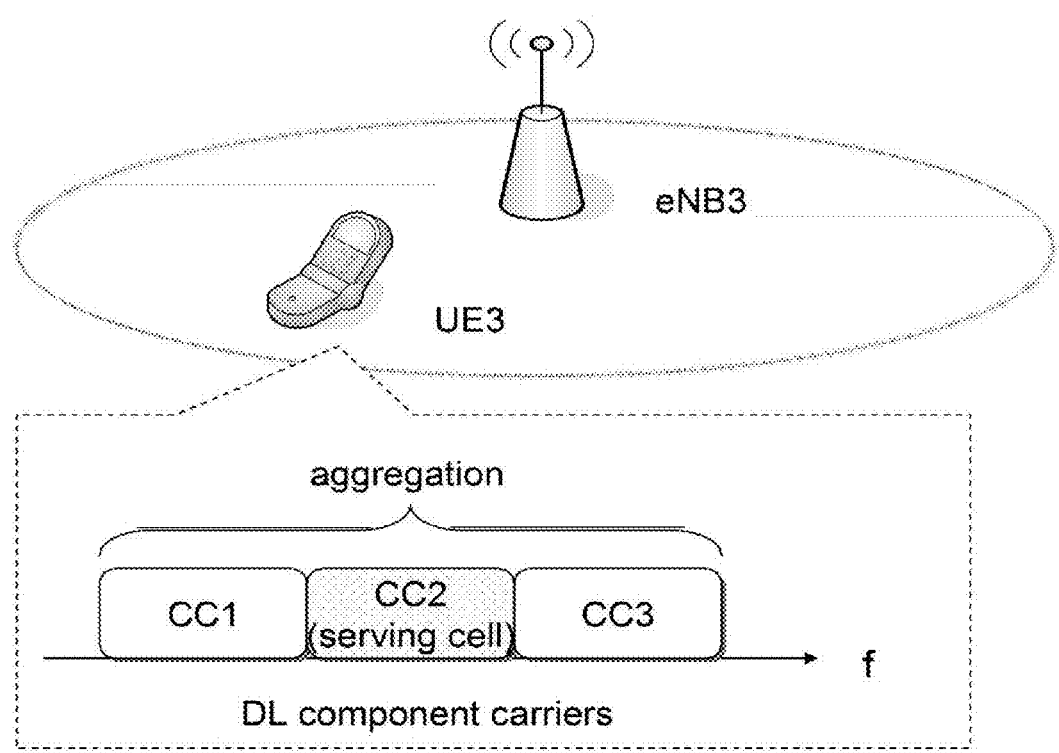
FIG. 20 is a view illustrating a configuration of a third radio communication system of another exemplary embodiment of the present invention.

FIG. 20 is a view illustrating an example of a schematic configuration of the radio communication system of another exemplary embodiment of the present invention.

This third radio communication system includes a radio base station eNB3 and a radio terminal UE3. Herein, the UE3 has completed a connection establishment (RRC Connection) for communicating with the eNB3. Further, the UE3 is assigned CC1 to CC3 as the Component Carrier (CC) capable of carrying out the Carrier Aggregation (CA), and is already in a state of being able to simultaneously receiving the data on the CC1 to the CC3. However, the CC2 is a DL CC of Serving cell. Herein, as the definition of the Serving cell, the CC that is used also when the CA is not carried out, the CC where a radio terminal camped before the radio terminal becomes active (RRC_Connected) (or the CC that can be camped), the CC where the radio terminal receives system information (System Information), and the like are thinkable. Further, the CC of the Serving cell is called a serving carrier (Serving carrier) or an anchor carrier (Anchor carrier). Additionally, each frequency of CC1 to CC3 may be continuous or discontinuous, and in addition, each frequency band of CC1 to CC3 may be identical or different. In addition, the eNB3 notifies the parameter of the DRX to the UE3, and the UE3 carries out the necessary configuration (for example, the setting of expiry values of the DRX-related timers, and the like) according to the above parameter. At this time, while it is expected that the parameter of the DRX may be common to the CC1 to the CC3, the parameter may differ CC by CC.

Next, the DRX control method at the time of the CA in the radio communication system of the third exemplary embodiment will be explained.

At first, the third radio communication system of the present invention independently performs operations (for example, extension of the Active Time) other than the DRX state (DRX level) control, out of a series of operations of the discontinuous reception (DRX) of the radio terminal (UE), on all component carriers (CCs) or one part thereof, respectively, and commonly takes the DRX state control. As shown in FIG. 20, when the UE3 can simultaneously use the CC1 to the CC3, the UE3 activates the drx-InactivityTimer, the HARQ RTT Timer, and the drx-RetransmissionTimer on each CC, and decides the Active Time. This makes it possible to realize a reduction in the power consumption of the UE according to the actual data reception on each CC at each the DRX cycle.

On the other hand, as the method of controlling the DRX state (DRX level), only a specific CC has the drxShortCycleTimer, and the drxShortCycleTimer is activated on the above CC, and all the CCs transit to the LongDRX from the ShortDRX at a time point when the drxShortCycleTimer expires. Herein, as a specific CC, the CC of the Serving cell in FIG. 20 is thinkable. The CC of the Serving cell is defined in various ways, and for example, the CC where a radio terminal camped at a time point when the radio terminal has become active (RRC_Connected), the CC where the radio terminal receives the configuration message (Configuration message) of the CA, the CC where the radio terminal received basic information of the cell such as the system information (System Information), and the like are thinkable.

These methods make it possible to realize the DRX state control based on not the data reception frequency of each CC but the data reception frequency on the CC of the Serving cell of each UE, and above all, the DRX state control based on the total data reception frequency. Additionally, individually deactivating (Deactivation) the CCs having become unnecessary during the DRX control makes it possible to avoid the excessive power consumption of the terminal. Further, with regard to a transition to the ShortDRX from the LongDRX, a configuration is made in such a manner that when the CC of the Serving cell receives the new data in the On-Duration of the LongDRX, all the CCs transits to the ShortDRX. However, the transition is not limited hereto, and for example, the method in which the CC of the Serving cell receives the data at the consecutive N-time DRX cycles, all other CCs also transit to the ShortDRX, the method in which M CCs or more receive the new data besides the CC of the Serving cell, all other CCs also transit to the ShortDRX, and the like are thinkable. However, the first-place method is preferred from a viewpoint of taking the DRX state control based on the total data reception frequency of the UE.

In addition, when the CCs assigned to the radio terminal are divided into the Subsets, a configuration may be made in such a manner that only a specific CC within the Subset has the drxShortCycleTimer, the drxShortCycleTimer is activated on the above CC, and all the CCs within the Subset transit to the LongDRX from the ShortDRX at a time point when the drxShortCycleTimer expires.

Additionally, while this radio communication system includes a preferred configuration in accordance with the specification of the 3GPP LTE, the configuration is not limited hereto.

Fifth Example

Figure 21:
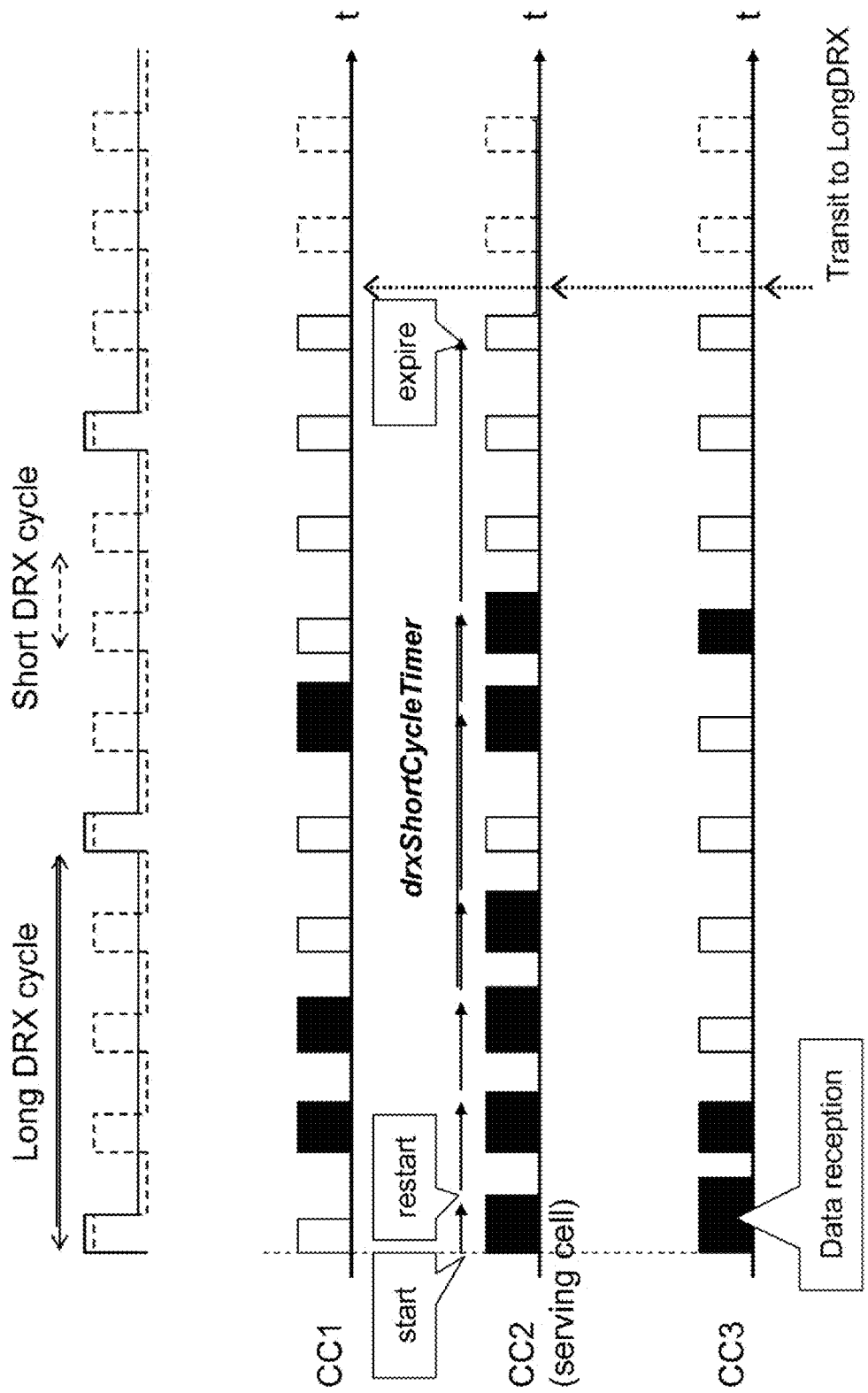
FIG. 21 is a view for explaining the DRX operation of the radio terminal in a fifth example in accordance with the present invention.

FIG. 21 is a view illustrating a situation of the DRX by CC of the radio terminal (UE), which explains the fifth example of the third exemplary embodiment.

In the example, while the UE activates the drx-InactivityTimer, the drx-RetransmissionTimer, and the HARQ RTT Timer on each CC and decides the Active Time, it activates the drxShortCycleTimer only on the CC of the Serving cell, and transits to the LongDRX from the ShortDRX at a time point when this drxShortCycleTimer expires. Herein, it is assumed that the UE is firstly in a state of the ShortDRX, and the length of the drxShortCycleTimer is equivalent to three times that of the ShortDRX cycle.

The UE firstly starts the drxShortCycleTimer at the first-place DRX cycle (the DRX cycle is counted in the ShortDRX). In FIG. 21, the CC2 and the CC3 receive the data at the first-place DRX cycle. The UE restarts the drxShortCycleTimer after the data reception on the CC2 is completed because the drxShortCycleTimer is controlled responding to the data reception situation of the CC2. Next, all the CCs receive the data at the second-place DRX cycle; however, the UE again restarts the drxShortCycleTimer after the data reception on the CC2 is completed also so as to match with the data reception situation of the CC2. Likewise, the UE restarts the drxShortCycleTimer so as to match with the data reception situation of the CC2, and waits for the expiry of the above timer. In FIG. 21, after the last data is received at the seventh-place DRX cycle, the drxShortCycleTimer expires at the tenth-place DRX cycle, and the UE transits to the LongDRX.

This DRX control method is most effective in a case of carrying out the CA, which basically uses the CC of the Serving cell at first, and in addition, uses other CCS when the data that should be transmitted exists. This makes it possible to realize a reduction in the power consumption of the UE at each DRX cycle while taking the DRX state control suitable for the total data reception frequency of the UE. In addition, employing this DRX control method makes the selection of the additional CCs other than the CC of the Serving cell at the time of the CA flexible, which enables the CC selection according to the communication channel quality and the load distribution between the CCs to be realized.

Figure 22:
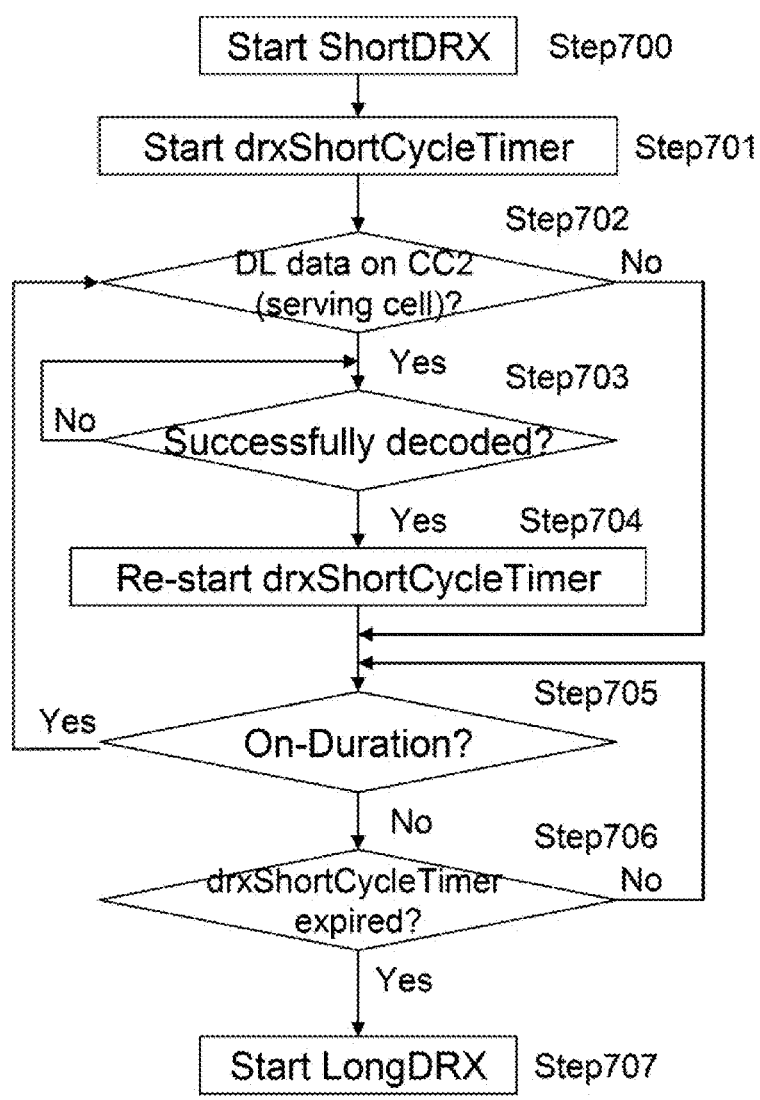
FIG. 22 is a flowchart of the radio terminal in the fifth example in accordance with the present invention.
Figure 23:
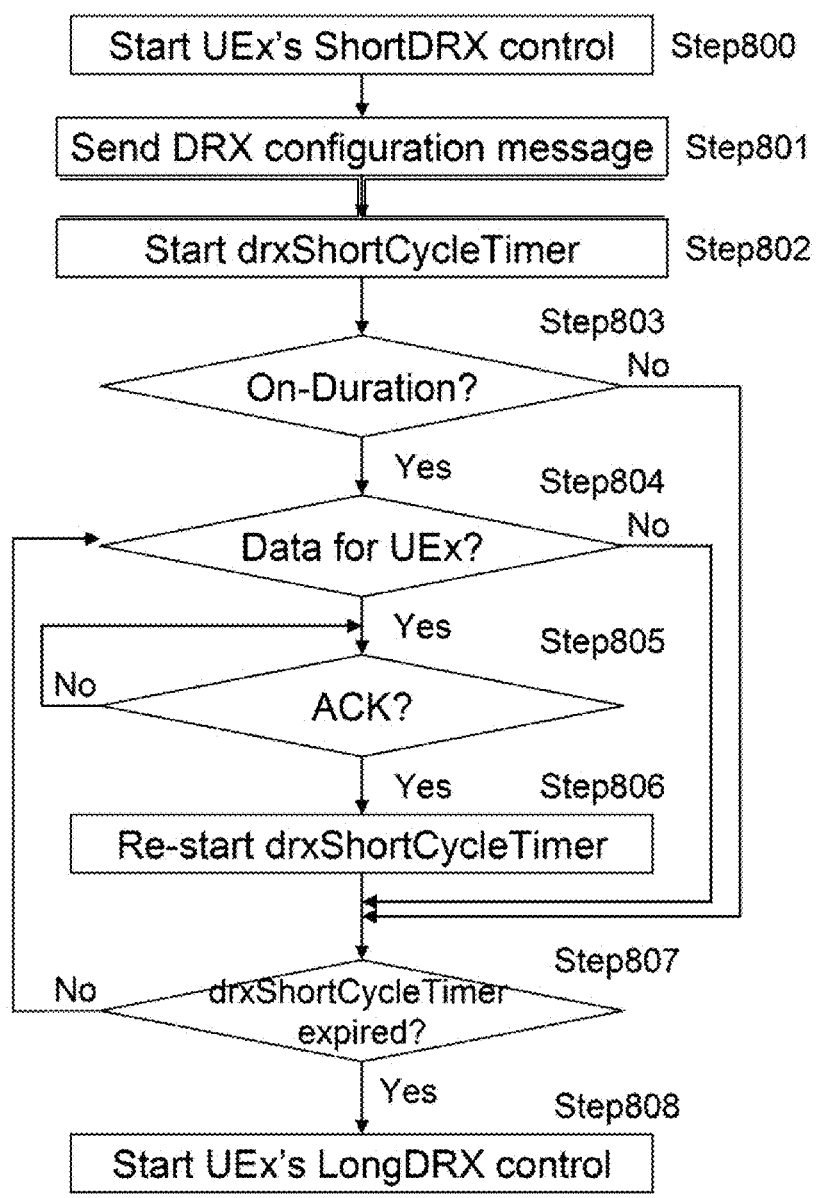
FIG. 23 is a flowchart of the radio base station in the fifth example in accordance with the present invention.
Figure 24:
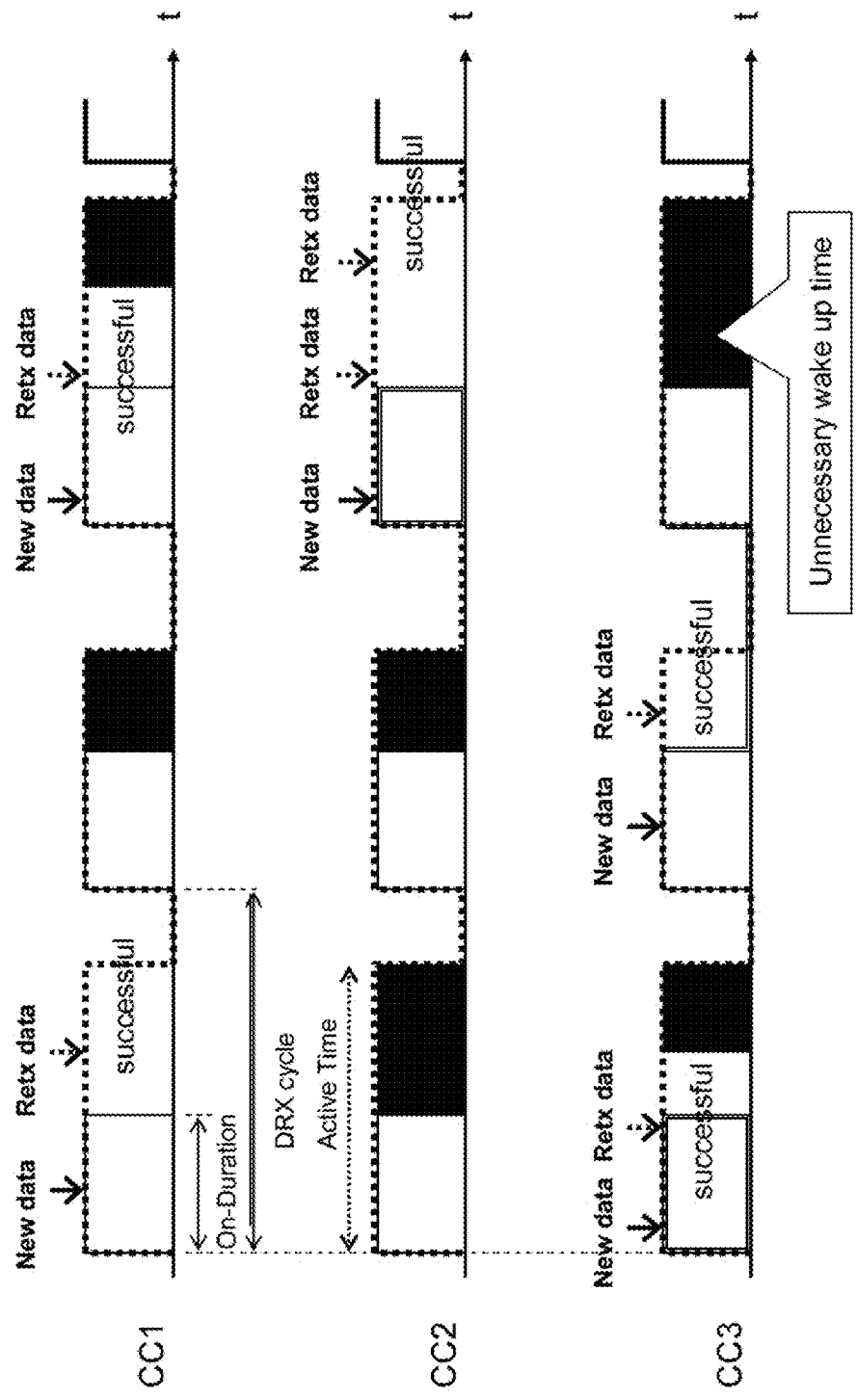
FIG. 24 is a view for explaining the DRX operation of the radio terminal in a conventional example.
Figure 25:
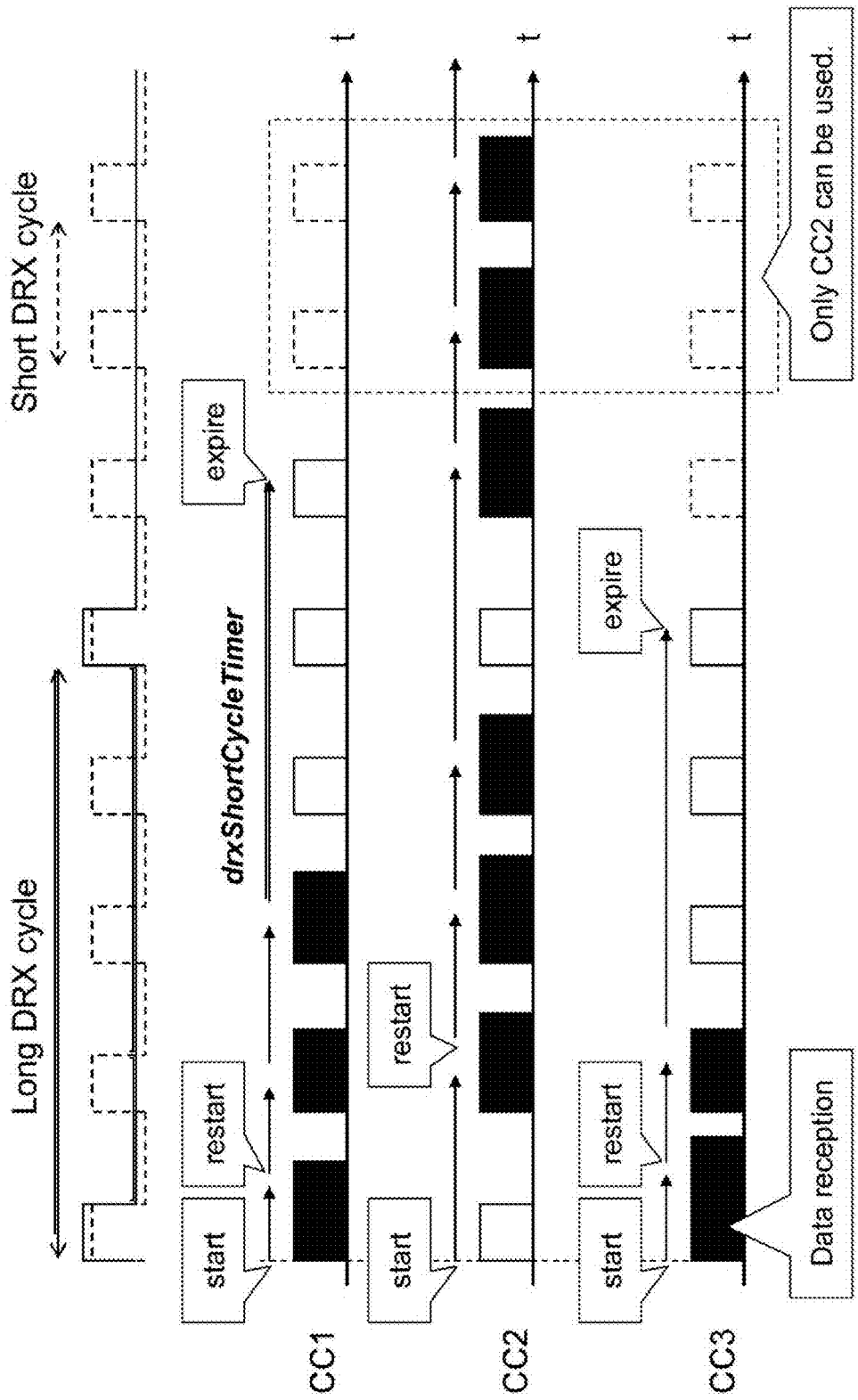
FIG. 25 is view for explaining the DRX operation of the radio terminal in another conventional example.

FIG. 22 is a view illustrating an operational flow of the communication controller 14 of the UE1 in this example, and FIG. 23 is a view illustrating an operational flow of the communication controller 24 of the eNB1 in this example.

In FIG. 22, the UE1 firstly initiates from the ShortDRX as the DRX state (DRX level) (Step 700), and starts the drxShortCycleTimer (Start drxShortCycleTimer) (Step 701).

The UE1 determines whether the downlink data (DL data) exists on CC2 (Serving cell) in the initial On-Duration (DL data on CC2?) (Step 702), and determines whether the downlink data was able to be successfully decoded (or whether the HARQ process has been finished (Successfully decoded?) when the downlink data has received (Step 703).

The UE1 restarts the drxShortCycleTimer after the downlink data can be successfully decoded (or after the HARQ process is finished) (Re-start drxShortCycleTimer (Step 704). Likewise, the UE1 determines whether the downlink data exists on the CC2 in the On-Duration period (Step 705), performs the similar operation when it exists, and continue to activate the remaining drxShortCycleTimers without stopping them when it does not exist. And, the UE1 determines whether the drxShortCycleTimer has expired (drxShortCycleTimer expired?) (Step 706), and transits to the LongDRX when the drxShortCycleTimer expires (or has expired) (Start LongDRX) (Step 707).

On the other hand, in FIG. 23, the communication controller 24 of the eNB1 starts the control of the ShortDRX for the UEx (x=1, 2, . . . ,) (Start UEx's ShortDRX control) (Step 800).

At first, the communication controller 24 sends the DRX configuration message (DRX configuration message) to the UEx (Step 801), and starts the drxShortCycleTimer (Step 802). The communication controller 24 determines whether the UEx is in the On-Duration period (On-Duration?) (Step 803), and furthermore determines whether the data to be sent to the above UEx exists when the UEx is in the On-Duration period (Data for UEx?) (Step 804). The communication controller 24 determines whether the data has been successfully decoded in the UE side, namely whether an acknowledge response (ACK) has been returned (or whether the HARQ process has been finished) when the data is transmitted, (ACK?) (Step 805). The communication controller 24 restarts the drxShortCycleTimer after confirming the reception of the acknowledge response (Re-start drxShortCycleTimer) (Step 806). And, the communication controller 24 determines whether the drxShortCycleTimer has expired (drxShortCycleTimer expired?) (Step 807), and judges that the above UEx transits to the LongDRX when the drxShortCycleTimer expires (has expired), and starts the control of the LongDRX (Start UEx's LongDRX control (Step 808).

Above, while the exemplary embodiments described so far assumes that the downlink control channel (PDCCH) and corresponding downlink data channel (PDSCH) corresponding are transmitted on each of the CCs that can be used in the case of CA, in the LTE the case in which the PDCCH is transmitted on a specific CC or on the CC different from the PDSCH is also being investigated. In this case, the determination as to whether the data exists for each CC in the radio terminal side is made based on whether the PDSCH of the above each CC has been scheduled either on the above each CC or by the received PDCCH.

Further, the DRX control by the UE in the case of the CA, and particularly, the operation of transiting to the LongDRX from the ShortDRX in the DRX state (DRX level) control were explained. However, the point of the present invention is applicable to a transition to the Idle state from the DRX operation. That is, it is thinkable that with the case in which the UE transits to the Idle state from the DRX (particularly, the LongDRX), the above transition is controlled by the timer that the eNB and/or the UE maintains, and in this case, commonly controlling the timer among the CCs where the CA is performed enables the state transition to the Idle from the DRX to be realized according to the total activities of the UE. Further, with the case of the system in which the Active Time is commonly configured, the point of the present invention can be also applied to the drx-InactivityTimer instead of the drxShortCycleTimer.

In addition, it is also possible to apply the point of the present invention to measurement (Measurement) of the neighboring cells and the successive resource assignment (Semi-persistent scheduling) by the UE in the case of the CA besides the DRX control. In the Measurement, for example, the method is thinkable in which also when the measurement parameter configuration (Measurement configuration) is shared, the actual measurement (Measurement) is performed independently on each CC, and the report (Measurement report) is shared. At this time, on respective UL CC corresponding to the each DL CC the measurement report may be performed, and on a certain CC the measurements report may be performed together. Further, in the implicit resource release (Implicit release) of Semi-persistent scheduling, there exists the method of commonly controlling the counts of not-yet-used resources of the uplink (Uplink: UL) etc. among the CCs. For example, the method of, when the UL resources previously assigned to all the CCs are not used yet, counting the above resources, and releasing the UL resource when the above value exceeds a predetermined value (ImplicitReleaseAfter: Non-Patent literatures 2 and 4), the method of counting the not-yet-used resource on each CC, and releasing the UL resource when the count values exceed predetermined values on all the CCs, respectively, and the like are thinkable.

In addition, while "3GPP LTE" was expected as the radio communication system in the exemplary embodiments described so far, a target of the present invention is not limited to hereto, and the present invention is applicable to 3GPP WCDMA (Wideband Code Division Multiple Access), GSM (Global System for Mobile communications), WiMAX (Worldwide interoperability for Microwave Access) and the like.

Hereinafter, yet specific examples are described.

When the DRX is set, the terminal (UE) performs the following operations for each subframe without fail.

When the ShortDRX Cycle is used and yet [(SFN*10)+subframe number] modulo (shortDRX-Cycle)=(drxStartOffset) modulo (shortDRX-Cycle), or when the LongDRX Cycle is used and yet [(SFN*10)+subframe number] modulo (longDRX-Cycle)=drxStartOffset), the UE starts onDurationTimer on each Activated component carrier if the Carrier Aggregation is set, and the UE starts onDurationTimer otherwise. Wherein, SFN is System Frame Number.

When the HARG RTT Timer expires at the present subframe and yet the data of soft buffer of the above HARQ process is not successfully decoded, the UE starts the drx-RetransmissionTimer for the above HARQ process on the above component carrier if the Carrier Aggregation is set, and the UE starts the drx-RetransmissionTimer for the above HARQ process otherwise.

When a DRX Command MAC control element is received, the UE stops the onDurationTimer on the above component carrier and yet stops the drx-InactivityTimer on the above component carrier if the Carrier Aggregation is set, and the UE stops the ondurationtimer and yet stops the drx-InactivityTimer otherwise.

When the drx-InactivityTimer is finished, or when the DRX Command MAC control element is received in the subframe, the UE starts or restarts the drxShortCycleTimer on the above component carrier and yet uses the Short DRX cycle on the above component carrier if the Carrier Aggregation is set and yet the Short DRX cycle is set, and the UE uses the Long DRX cycle on the above component carrier otherwise.

When the drx-InactivityTimer is finished, or when the DRX Command MAC control element is received in the subframe, the UE starts or restarts the drxShortCycleTimer and yet uses the Short DRX cycle if the Short DRX cycle is set, and the UE uses the Long DRX cycle otherwise.

When the Carrier Aggregation is set, the UE uses the Long DRX cycle if the drxShortCycleTimer expires on the present subframe and yet the drxShortCycleTimer expires (or has expired) on all the Activated component carriers other than the above component carrier, and the UE uses the Long DRX cycle if Carrier Aggregation is not set and yet the drxShortCycleTimer expires on the present subframe.

The UE monitors the PDCCH for the PDCCH-subframe that is not necessary for the uplink transmission of a half-duplex FDD system and yet is not one part of the set measurement gap during the Active Time.

When the PDCCH clearly states the downlink transmission, or when the downlink transmission is previously assigned to the above subframe, the UE starts the HARQ RTT Timer in the above HARQ process on the above component carrier and yet stops the drx-RetransmissionTimer in the above HARQ process on the above component carrier if the Carrier Aggregation is set, and the UE starts the HARQ RTT Timer in the above HARQ process and yet stops the drx-RetransmissionTimer in the above HARQ process otherwise.

When the PDCCH clearly states the new transmission (DL or UL), the UE starts or restarts the drx-InactivityTimer on the above component carrier if the Carrier Aggregation is set, and the UE starts or restarts the drx-InactivityTimer otherwise.

The UE does not report CQI/PMI/RI in PUCCH and nor transmits SRS in the time other than the Active Time.

Additionally, while in the above-described exemplary embodiments and examples, each part was configured with hardware, it may be configured with an information processing unit such as CPU that operates under a program. In this case, the program causes the CPU etc. to execute the above-described operations.

Further, the content of the above-mentioned exemplary embodiments can be expressed as follows.

(Supplementary note 1) A radio communication system in which a radio terminal is configured to communicate using a plurality of carrier components each having a different frequency, comprising:

a reception start timing control means that commonly controls a cycle of a reception start timing for a predetermined channel among at least one part of the component carriers assigned to the radio terminal: and a reception control means that controls a reception period for said predetermined channel on at least one part of the component carriers assigned to said radio terminal, said reception period being started from said reception start timing.

(Supplementary note 2) A radio communication system according to Supplementary note 1, wherein said reception control means controls the reception period for said predetermined channel to be started from said reception start timing, based on a timer that runs on each of at least one part of the component carriers assigned to said radio terminal.

(Supplementary note 3) A radio communication system according to Supplementary note 1 or Supplementary note 2, wherein said reception start timing control means selects one cycle of the reception start timing from among at least two cycles or more of said reception start timing each having a different length.

(Supplementary note 4) A radio communication system according to Supplementary note 3, wherein said reception start timing control means selects said cycle of the reception start timing based on data reception situations on at least one part of the component carriers assigned to said radio terminal.

(Supplementary note 5) A radio communication system according to Supplementary note 3 or Supplementary note 4, wherein said reception start timing control means transits to the cycle of the reception start timing which is longer than the current cycle of the reception start timing, when new data is not received for a predetermined period on at least one part of the component carriers assigned to said radio terminal.

(Supplementary note 6) A radio communication system according to Supplementary note wherein said reception start timing control means:
comprises at least one timer that, when data is received during measurement and the above data is successfully decoded, restart and measure a predetermined period, said timers configured correspondingly to at least one part of the component carriers assigned to said radio terminal; and
transits to the cycle of the reception start timing which is longer than the current cycle of the reception start timing, when said timer reaches a predetermined period.

(Supplementary note 7) A radio communication system according to Supplementary note wherein said reception start timing control means:
comprises a timer that, when data is received during measurement on any of at least one part of the component carriers assigned to said radio terminal and the above data is successfully decoded, restart the measurement; and
transits to the cycle of the reception start timing which is longer than the current cycle of the reception start timings, when the measurement period of sais timer reaches a predetermined period.

(Supplementary note 8) A radio communication system according to Supplementary note wherein said reception start timing control means:
comprises:
at least one first timer that, when data is received during measurement, and the above data is successfully decoded, restart and measure a predetermined period, said first timer configured correspondingly to at least one part of the component carriers assigned to said radio terminal; and
a second timer that restarts the measurement when said first timer restarts the measurement, and measures a predetermined period; and transits to the cycle of the reception start timing which is longer than the current cycle of
the reception start timing, when the measurement period of said second timer reaches a predetermined period.

(Supplementary note 9) A radio communication system according to Supplementary note wherein said reception start timing control means:
comprises:
first timers that, when data is received during measurement and the above data is successfully decoded, restart and measure a predetermined period, said timers configured correspondingly to at least one part of the component carriers assigned to said radio terminal; and
a second timer that corresponds to any of said first timers, and restarts the measurement when said corresponding first timer restarts the measurement; and
causes said second timer to correspond to any of said first timers on measurement other than said corresponding first timer when the measurement period of said second timer reaches a predetermined period, and transits to the cycle of the reception start timing which is longer than the current cycle of the reception start timing when the measurement period of said second timer again reaches a predetermined period and all said first timers are not performing said measurement.

(Supplementary note 10) A radio communication system according to one of Supplementary note 1 to Supplementary note 4, wherein said reception start timing control means:
comprises:
timers that, when data is received during measurement and yet the above data is successfully decoded, restart and measure a predetermined period, said timers configured correspondingly to at least one part of the component carriers assigned to said radio terminal; and
transits to the cycle of the reception start timing which is longer than the current cycle of the reception start timing, when all the timers are not performing said measurement.

(Supplementary note 11) A radio communication system according to one of Supplementary note 3 to Supplementary note 10, wherein said reception start timing control means transits to the cycle of the reception start timing which is shorter than the current cycle of the reception start timing on at least one part of said assigned component carriers or on a predetermined specific kind of the component carrier when the new data is received on at least one component carrier belonging to at least one part of the component carriers assigned to said radio terminal.

(Supplementary note 12) A radio communication system according to one of Supplementary note 1 to Supplementary note 4, wherein said reception start timing control means:
comprises a timer that, when data is received during measurement and the above data is successfully decoded, restarts and measures a predetermined period, said timer configured correspondingly to a specific kind of the component carrier, which belongs to the component carriers assigned to said radio terminal; and
transits to the cycle of the reception start timing which is longer than the current cycle of the reception start timing, when the measurement period of said timer reaches a predetermined period.

(Supplementary note 13) A radio communication system according to Supplementary note 12, wherein said reception start timing control means transits to the cycle of the reception start timing, which is shorter than the current cycle of the reception start timing, on at least one part of said assigned component carriers or on said specific kind of the component carrier, when the new data is received on said specific kind of the component carrier.

(Supplementary note 14) A radio communication system according to Supplementary note 12 or Supplementary note 13, wherein said specific kind of the component carrier is at least one of a component carrier of a serving cell and an anchor component carrier.

(Supplementary note 15) A radio communication system according to one of Supplementary note 1 to Supplementary note 11, wherein said reception start timing control means and/or said reception control means take a control for each of at least one Subset or more, said Subset being a set of the component carriers assigned to the radio terminal.

(Supplementary note 16) A radio communication system according to one of Supplementary note 1 to Supplementary note 15, wherein said reception start timing control means and/or said reception control means take a control related to discontinuous reception.

(Supplementary note 17) A radio communication system according to one of Supplementary note 1 to Supplementary note 16, wherein said reception control means separately controls the reception period for said predetermined channel to be started from said reception start timing on each of at least one part of the component carriers assigned to said radio terminal.

(Supplementary note 18) A radio communication system according to one of Supplementary note 1 to Supplementary note 17, wherein said reception control means commonly controls the reception period for said predetermined channel to be started from said reception start timing on each of at least one part of the component carriers assigned to said radio terminal.

(Supplementary note 19) A radio terminal capable of communicating using a plurality of carrier components each having a different frequency, comprising:
  a reception start timing control means that commonly controls a cycle of a reception start timing for a predetermined channel among at least one part of the component carriers assigned to the radio terminal; and
  a reception control means that controls a reception period for said predetermined channel on at least one part of the component carriers assigned to said radio terminal, said reception period being started from said reception start timing.

(Supplementary note 20) A radio terminal according to Supplementary note 19, wherein said reception control means controls the reception period for said predetermined channel to be started from said reception start timing, based on a timer that runs on each of component carrier belonging to at least one part of the component carriers assigned to said radio terminal.

(Supplementary note 21) A radio terminal according to Supplementary note 19 or Supplementary note 20, wherein said reception start timing control means selects one cycle of the reception start timing from among at least two cycles or more of said reception start timing each having a different length.

(Supplementary note 22) A radio terminal according to Supplementary note 21, wherein said reception start timing control means selects said cycle of the reception start timing based on data reception situations on at least one part of the component carriers assigned to said radio terminal.

(Supplementary note 23) A radio terminal according to Supplementary note 21 or Supplementary note 22, wherein said reception start timing control means transits to the cycle of the reception start timing which is longer than the current cycle of the reception start timing, when new data is not received for a predetermined period on at least one part of the component carriers assigned to said radio terminal.

(Supplementary note 24) A radio terminal according to Supplementary note 23, wherein said reception start timing control means:
  comprises at least one timer that, when data is received during measurement, and the above data is successfully decoded, restarts and measures a predetermined period, said timer configured correspondingly to a specific kind of the component carrier, out of the component carriers assigned to said radio terminal; and
  transits to the cycle of the reception start timing which is longer than the current cycle of the reception start timing, when said timer reaches a predetermined period.

(Supplementary note 25) A radio terminal according to Supplementary note 23, wherein said reception start timing control means:
  comprises a timer that, when data is received during measurement on any component carrier belonging to of at least one part of the component carriers assigned to said radio terminal and the above data is successfully decoded, restart the measurement; and
  transits to the cycle of the reception start timing which is longer than the current cycle of the reception start timings, when the measurement period of said timer reaches a predetermined period.

(Supplementary note 26) A radio terminal according to Supplementary note 23, wherein said reception start timing control means:
  comprises:
  at least one first timer that, when data is received during measurement, and the above data is successfully decoded, restart and measure a predetermined period, said first timer configured correspondingly to at least one part of the component carriers assigned to said radio terminal; and
  a second timer that restarts the measurement when said first timer restarts the measurement, and measures a predetermined period; and
  transits to the cycle of the reception start timing which is longer than the current cycle of the reception start timing, when the measurement period of said second timer reaches a predetermined period.

(Supplementary note 27) A radio terminal according to Supplementary note 23, wherein said reception start timing control means:
  comprises:
  first timers that, when data is received during measurement and the above data is successfully decoded, restart and measure a predetermined period, said timers configured correspondingly to at least one part of the component carriers assigned to said radio terminal; and
  a second timer that corresponds to any of said first timers, and restarts the measurement when said corresponding first timer restarts the measurement; and
  causes said second timer to correspond to any of said first timers on measurement other than said corresponding first timer when the measurement period of said second timer reaches a predetermined period, and transits to the cycle of the reception start timing which is longer than the current cycle of the reception start timing when the measurement period of said second timer again reaches a predetermined period and all said first timers are not performing said measurement.

(Supplementary note 28) A radio terminal according to one of Supplementary note 19 to Supplementary note 22, wherein said reception start timing control means:
comprises:
timers that, when data is received during measurement and yet the above data is successfully decoded, restart and measure a predetermined period, said timers configured correspondingly to at least one part of the component carriers assigned to said radio terminal; and
transits to the cycle of the reception start timing which is longer than the current cycle of the reception start timing, when all the timers are not performing said measurement.

(Supplementary note 29) A radio terminal according to one of Supplementary note 19 to Supplementary note 28, wherein said reception start timing control means transits to the cycle of the reception start timing which is shorter than the current cycle of the reception start timing on at least one part of said assigned component carriers or on a predetermined specific kind of the component carrier when the new data is received on at least one component carrier belonging to at least one part of the component carriers assigned to said radio terminal.

(Supplementary note 30) A radio terminal according to one of Supplementary note 19 to Supplementary note 22, wherein said reception start timing control means:
comprises a timer that, when data is received during measurement and yet the above data is successfully decoded, restarts and measures a predetermined period, said timer configured correspondingly to a specific kind of the component carrier, out of the component carriers assigned to said radio terminal; and
transits to the cycle of the reception start timing which is longer than the current cycle of the reception start timing, when said timer reaches a predetermined period.

(Supplementary note 31) A radio terminal according to Supplementary note 30, wherein said reception start timing control means transits to the cycle of the reception start timing, which is shorter than the current cycle of the reception start timing, on at least one part of said assigned component carriers or on said specific kind of the component carrier, when the new data is received on said specific kind of the component carrier.

(Supplementary note 32) A radio terminal according to Supplementary note 30 or Supplementary note 31, wherein said specific kind of the component carrier is at least one of a component carrier of a serving cell and an anchor component carrier.

(Supplementary note 33) A radio terminal according to one of Supplementary note 19 to Supplementary note 32, wherein said reception start timing control means and/or said reception control means take a control for each of at least one Subset or more, said Subset being a set of the component carriers assigned to the radio terminal.

(Supplementary note 34) A radio communication system according to one of Supplementary note 19 to Supplementary note 33, wherein said reception start timing control means and/or said reception control means take a control related discontinuous reception.

(Supplementary note 35) A radio terminal according to one of Supplementary note 19 to Supplementary note 34, wherein said reception control means separately controls the reception period for said predetermined channel to be started from said reception start timing on each of at least one part of the component carriers assigned to said radio terminal.

(Supplementary note 36) A radio terminal according to one of Supplementary note 19 to Supplementary note 35, wherein said reception control means commonly controls the reception period for said predetermined channel to be started from said reception start timing on each of at least one part of the component carriers assigned to said radio terminal.

(Supplementary note 37) A radio base station for transmitting/receiving data to/from a radio terminal capable of communicating using a plurality of component carriers each having a different frequency that comprises a reception start timing control means for commonly controlling a cycle of a reception start timing for a predetermined channel among at least one part of the component carriers assigned to said radio terminal, and a reception control means for controlling a reception period for said predetermined channel to be started from said reception start timing on at least one part of the component carriers assigned to said radio terminal, said radio base station comprising a means that takes synchronization with the cycle of the reception start timing for the predetermined channel to be controlled by said radio terminal.

(Supplementary note 38) A radio base station according to Supplementary note 37, wherein said reception control means controls the reception period for said predetermined channel to be started from said reception start timing, based on a timer that runs on each of at least one part of the component carriers assigned to said radio terminal.

(Supplementary note 39) A radio communication method in which a radio terminal is configured to communicate using a plurality of component carriers each having a different frequency, comprising:
commonly controlling a cycle of a reception start timing for a predetermined channel among at least one part of the component carriers assigned to the radio terminal; and
controlling a reception period for said predetermined channel on at least one part of the component carriers assigned to said radio terminal, said reception period being started from said reception start timing.

(Supplementary note 40) A radio communication method according to Supplementary note 39, comprising controlling the reception period for said predetermined channel to be started from said reception start timing, based on a timer that runs on each of at least one part of the component carriers assigned to said radio terminal.

(Supplementary note 41) A radio communication method according to Supplementary note 39 or Supplementary note 40, comprising commonly controlling the reception period for said predetermined channel to be started from said reception start timing on each of at least one part of the component carriers assigned to said radio terminal.

(Supplementary note 42) A program of a radio terminal capable of communicating using a plurality of component carriers each having a different frequency, said program causing the radio terminal to execute:
a reception start timing control process of commonly controlling a cycle of a reception start timing for a predetermined channel among at least one part of the component carriers assigned to the radio terminal; and
a reception control process of controlling a reception period for said predetermined channel on at least one part of the component carriers assigned to said radio terminal, said reception period being started from said reception start timing.

(Supplementary note 43) A program according to Supplementary note 42, wherein said reception control process controls the reception period for said predetermined channel to be started from said reception start timing, based on a timer that runs on each component carrier belonging to at least one part of the component carriers assigned to said radio terminal.

(Supplementary note 44) A program according to Supplementary note 42 or Supplementary note 43, wherein said reception control process commonly controls the reception period of said predetermined channel to be started from said reception start timing on each component carrier belonging to at least one part of the component carriers assigned to said radio terminal.

Above, although the present invention has been particularly described with reference to the preferred embodiments and the examples, it should be readily apparent to those of ordinary skill in the art that the present invention is not always limited to the above-mentioned embodiment and examples, and changes and modifications in the form and details may be made without departing from the spirit and scope of the invention.

REFERENCE SIGNS LIST 11 receiver
12 transmitter
13 signal processor
14 communication controller
21 receiver
22 transmitter
23 signal processor
24 communication controller
25 terminal manager

The invention claimed is:

1. A method for user equipment capable of performing carrier aggregation by using multiple component carriers, the method comprising:
   receiving, from a base station:
      a first timer value of Discontinuous Reception (DRX) Inactivity Timer (drx-InactivityTimer),
      a second timer value of DRX Retransmission Timer (drx-RetransmissionTimer), and
      a third timer value of DRX Short Cycle Timer (drxShortCycleTimer), the drxShortCycleTimer being used for all of the multiple component carriers;
   starting or restarting the drx-InactivityTimer if Physical Downlink Control Channel (PDCCH) in a component carrier among the multiple component carriers indicates a downlink transmission;
   starting a Hybrid Automatic Repeat reQuest (HARQ) Round Trip Time (RTT) Timer corresponding to a HARQ process for the component carrier if PDCCH in the component carrier indicates the downlink transmission;
   starting the drx-RetransmissionTimer corresponding to the HARQ process for the component carrier if the HARQ RTT Timer expires and if data of the HARQ process was not successfully decoded;
   starting or restarting the drxShortCycleTimer linked to all of the multiple component carriers and using a short DRX cycle if the drx-InactivityTimer expires; and
   using a long DRX cycle on all of the multiple component carriers if the drxShortCycleTimer expires.

2. A user equipment comprising:
   a transceiver; and
   a processor configured to:
   perform carrier aggregation by using multiple component carriers;
   receive, from a base station via the transceiver:
      a first timer value of Discontinuous Reception (DRX) Inactivity Timer (drx-InactivityTimer),
      a second timer value of DRX Retransmission Timer (drx-RetransmissionTimer), and
      a third timer value of DRX Short Cycle Timer (drxShortCycleTimer), the drxShortCycleTimer being used for all of the multiple component carriers;
   start or restart the drx-InactivityTimer if Physical Downlink Control Channel (PDCCH) in a component carrier among the multiple component carriers indicates a downlink transmission;
   start a Hybrid Automatic Repeat reQuest (HARQ) Round Trip Time (RTT) Timer corresponding to a HARQ process for the component carrier if PDCCH in the component carrier indicates the downlink transmission;
   start the drx-RetransmissionTimer corresponding to the HARQ process for the component carrier if the HARQ RTT Timer expires and if data of the HARQ process was not successfully decoded;
   start or restart the drxShortCycleTimer linked to all of the multiple component carriers and use a short DRX cycle if the drx-InactivityTimer expires; and
   use a long DRX cycle on all of the multiple component carriers if the drxShortCycleTimer expires.

3. A method for a base station, the method comprising:
   performing carrier aggregation by using multiple component carriers;
   transmitting to a user equipment:
      a first timer value of Discontinuous Reception (DRX) Inactivity Timer (drx-InactivityTimer),
      a second timer value of DRX Retransmission Timer (drx-RetransmissionTimer), and
      a third timer value of DRX Short Cycle Timer (drxShortCycleTimer), the drxShortCycleTimer being used for all of the multiple component carriers;
   wherein the drx-InactivityTimer is started or restarted if Physical Downlink Control Channel (PDCCH) in a component carrier among the multiple component carriers indicates a downlink transmission;
   wherein, if PDCCH in the component carrier indicates the downlink transmission, a Hybrid Automatic Repeat reQuest (HARQ) Round Trip Time (RTT) Timer corresponding to a HARQ process for the component carrier is started;
   wherein, if the HARQ RTT Timer expires and if data of the HARQ process was not successfully decoded, the drx-RetransmissionTimer corresponding to the HARQ process for the component carrier is started;
   wherein, if the drx-InactivityTimer expires, a short DRX cycle is used and the drxShortCycleTimer linked to all of the multiple component carriers is started or restarted; and
   wherein, if the drxShortCycleTimer expires, a long DRX cycle on all of the multiple component carriers is used.

* * * * *